United States Patent
Takahashi et al.

(10) Patent No.: US 10,032,232 B2
(45) Date of Patent: Jul. 24, 2018

(54) INFORMATION PROCESSING SYSTEM, INFORMATION PROCESSING METHOD, AND COMPUTER PROGRAM PRODUCT

(71) Applicants: Satoshi Takahashi, Kanagawa (JP); Hideki Ohhashi, Kanagawa (JP)

(72) Inventors: Satoshi Takahashi, Kanagawa (JP); Hideki Ohhashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 31 days.

(21) Appl. No.: 14/576,465

(22) Filed: Dec. 19, 2014

(65) Prior Publication Data

US 2015/0187022 A1    Jul. 2, 2015

(30) Foreign Application Priority Data

Dec. 27, 2013 (JP) .................. 2013-273319
Oct. 28, 2014 (JP) .................. 2014-219642

(51) Int. Cl.
*G06Q 40/02* (2012.01)
*G06Q 40/00* (2012.01)
G06Q 30/02 (2012.01)
G06Q 50/16 (2012.01)

(52) U.S. Cl.
CPC ................... *G06Q 40/12* (2013.12)

(58) Field of Classification Search
USPC ............ 358/1.15, 1.9; 382/182, 229; 705/30
See application file for complete search history.

(56) References Cited

U.S. PATENT DOCUMENTS

| 6,704,119 B1* | 3/2004 | Suzuki ............. G06F 17/30011 358/1.15 |
| 2006/0173904 A1* | 8/2006 | Nakajima ......... G06F 17/30011 |
| 2007/0206884 A1* | 9/2007 | Kato ....................... G06K 9/72 382/305 |
| 2010/0008535 A1* | 1/2010 | Abulafia ............. G06K 9/2054 382/100 |
| 2015/0259247 A1 | 9/2015 | Watanabe |

FOREIGN PATENT DOCUMENTS

| JP | 08-331298 | 12/1996 |
| JP | 2000-112344 | 4/2000 |
| JP | 2004-056468 | 2/2004 |
| JP | 2015-186905 | 10/2015 |

* cited by examiner

*Primary Examiner* — Fahd A Obeid
*Assistant Examiner* — Reva R Danzig
(74) *Attorney, Agent, or Firm* — Cooper & Dunham LLP

(57) ABSTRACT

An information processing system comprises: an accepting unit that accepts identification information for identifying a user of an apparatus; a reading unit that reads an image on a document to output image data; an extracting unit that extracts character string information including a character string in the image and first position information on the character string in the image from the image data; a storage unit that stores therein allocation information in which an item relating to settlement is associated with second position information on the item on the document; an allocating unit that compares the allocation information with the character string information to allocate the item to the character string; and a transmitting unit that transmits settlement information including the character string, the item allocated to the character string, and the identification information.

13 Claims, 13 Drawing Sheets

FIG.3

| IDENTIFICATION INFORMATION | ATTRIBUTE INFORMATION | | |
|---|---|---|---|
| | USER NAME | DEPARTMENT CODE | BUDGET CODE |
| 0001 | TARO RICOH | 01234 | 0123456, 0123457, 2123456 |
| 0002 | HANAKO RICOH | 01235 | 1223456, 0123444 |
| ... | ... | ... | ... |

FIG.4

| FORMAT IDENTIFICATION INFORMATION | | ALLOCATION INFORMATION | | | |
|---|---|---|---|---|---|
| FORMAT NUMBER | FORMAT NAME | PRICE | DATE | OBJECT | CLAIMANT |
| 0001 | XX SHOKAI, Ltd. | (300, 150, 400, 200) | (500, 10, 580, 30) | (300, 210, 400, 240) | (450, 260, 580, 320) |
| 0002 | ABC CORPORATION | (200, 150, 300, 200) | (400, 10, 480, 30) | (200, 210, 300, 240) | (350, 260, 480, 320) |
| ... | ... | ... | ... | ... | ... |

FIG.6

| OBJECT | OBJECT CODE |
|---|---|
| STATIONERY | 10001 |
| BALLPOINT PEN | 10001 |
| SHEET | 10001 |
| KEYBOARD | 10101 |
| MOUSE | 10101 |
| EXPENSES FOR FOOD AND DRINK | 20100 |
| CHARGES FOR FOOD AND DRINK | 20100 |

FIG.7

| CLAIMANT | CLAIMANT CODE |
|---|---|
| XX SEISAKUSHO, Ltd | 10101 |
| ABC CORPORATION | 20101 |
| XX SHOKAI, Ltd. | 20102 |
| ... | ... |

FIG.14

REGISTER FORMAT
(MOVE REQUIRED FORM TO DISPLAYED DOCUMENT)

No. 123457

SAMPLE

★ PRICE

YEAR DATE DAY    RECEIVED ON ...

BREAKDOWN

REVENUE STAMP

PRICE WITHOUT TAX

CONSUMPTION TAX AND THE LIKE ( %)

XX CORPORATION
〒OOO-OOO TOKYO OOOO
TEL OO-OOO-OOO
FAX 01-123-456

CLAIMANT   OBJECT                    Cancel   OK 88D   88C   88B                      88H   88I

INFORMATION PROCESSING SYSTEM, INFORMATION PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2013-273319 filed in Japan on Dec. 27, 2013 and Japanese Patent Application No. 2014-219642 filed in Japan on Oct. 28, 2014.

BACKGROUND OF THE INVENTION

1. Field of the Invention

The present invention relates to an information processing system, an apparatus, an information processing device, an information processing method, a computer program, and a recording medium.

2. Description of the Related Art

To settle accounts at work, workers input contents corresponding to items required for the settlement and claim the accounts from an administrative department. In the conventional technologies, however, the user needs to manually input the items in the entry fields. This configuration makes the input troublesome and causes input errors.

In view of the problem described above, there is a need to provide an information processing system, an information processing method, and a computer program product that can reduce a workload relating to settlement.

SUMMARY OF THE INVENTION

It is an object of the present invention to at least partially solve the problems in the conventional technology.

According to the present invention, there is provided an information processing system comprising: an accepting unit that accepts identification information for identifying a user of an apparatus; a reading unit that reads an image on a document to output image data; an extracting unit that extracts character string information including a character string in the image and first position information on the character string in the image from the image data; a storage unit that stores therein allocation information in which an item relating to settlement is associated with second position information on the item on the document; an allocating unit that compares the allocation information with the character string information to allocate the item to the character string; and a transmitting unit that transmits settlement information including the character string, the item allocated to the character string, and the identification information.

The present invention also provides an information processing method comprising: accepting identification information for identifying a user of an apparatus; reading an image on a document and outputting image data; extracting character string information including a character string in the image and first position information on the character string in the image from the image data; comparing allocation information in which an item relating to settlement is associated with second position information on the item on the document with the character string information and allocating the item to the character string; and transmitting settlement information including the character string, the item allocated to the character string, and the identification information to a server device via a network.

The present invention also provides a computer program product that contains a computer program that causes a computer to execute: accepting identification information for identifying a user of an apparatus; reading an image on a document and outputting image data; extracting character string information including a character string in the image and first position information on the character string in the image from the image data; comparing allocation information in which an item relating to settlement is associated with second position information on the item on the document with the character string information and allocating the item to the character string; and transmitting settlement information including the character string, the item allocated to the character string, and the identification information to a server device via a network.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram illustrating an example of a data structure of user information;

FIG. 4 is a diagram illustrating an example of a data structure of allocation information;

FIG. 6 is a diagram illustrating an example of a data structure of code management information on sub-items of an item "object";

FIG. 7 is a diagram illustrating an example of a data structure of code management information on sub-items of an item "claimant";

FIG. 14 is a diagram for explaining an example of a new format registration screen;

DETAILED DESCRIPTION OF THE PREFERRED EMBODIMENTS

Exemplary embodiments of an information processing system, an information processing method, and a computer program product are described below in greater detail with reference to the accompanying drawings. In the description below, the information processing device is applied to a multifunction peripheral (MFP); however, the embodiments are not limited thereto. The MFP is a device having at least a scanner function out of a printing function, a copying function, a scanner function, and a facsimile function.

In the information processing system, for example, a screen including entry fields for items required for a settlement of accounts at work is displayed, and a user inputs required values in the respective entry fields while viewing the displayed screen. By the input work, settlement information is transmitted to a device used by an administrator or the like from a terminal through which the values are input. And, for reducing input work, document data obtained by computerizing in advance is stored in a medium in association with bibliographic information, then bibliographic information from image data obtained by scanning a document image is extracted, and document data corresponding to the bibliographic information is read and printed.

Figure 1:
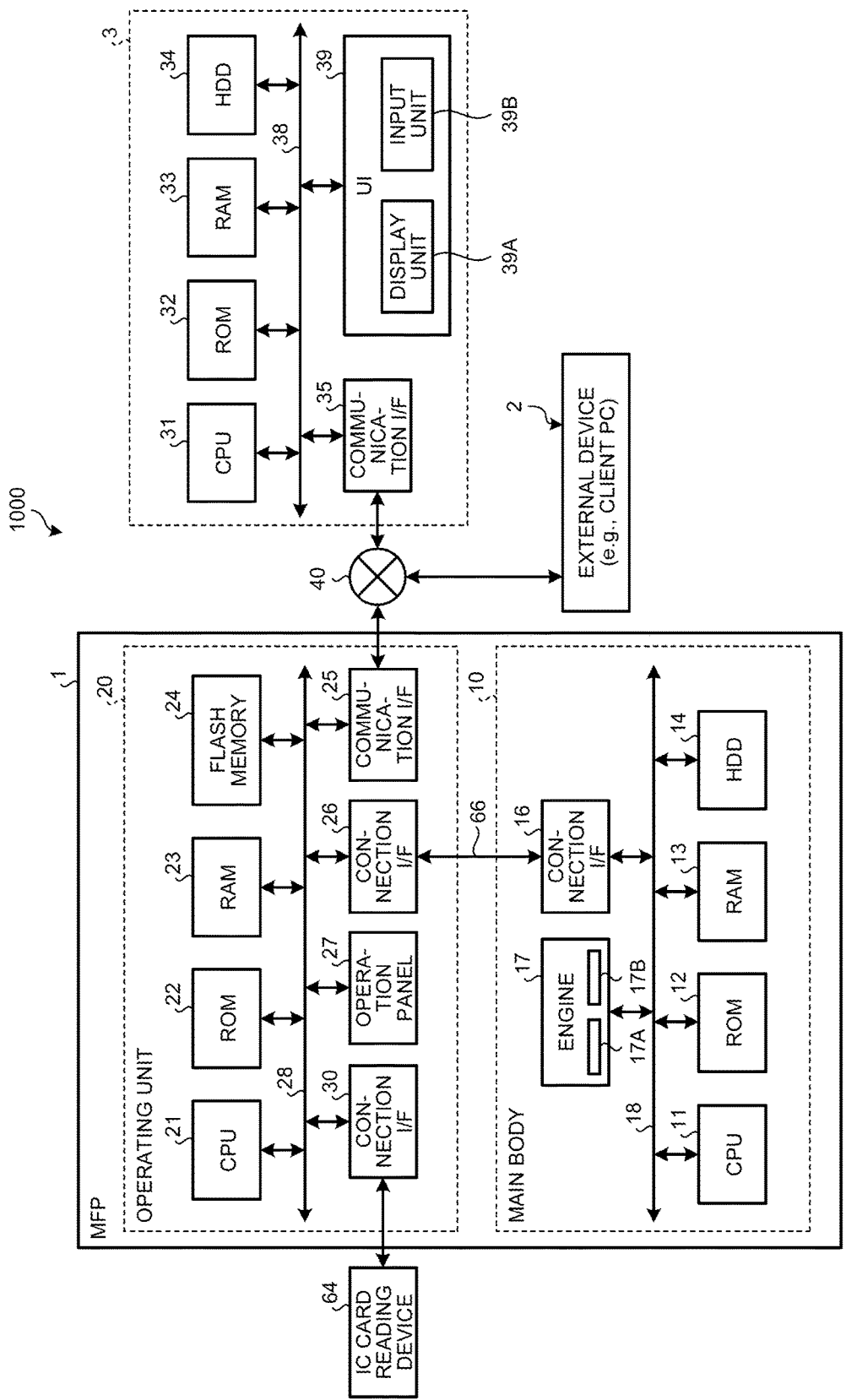
FIG. 1 is a block diagram illustrating an exemplary hardware configuration of an information processing system according to an embodiment of the present invention.

FIG. 1 is a block diagram illustrating an exemplary hardware configuration of an information processing system 1000 according to an embodiment of the present invention. As illustrated in FIG. 1, the information processing system 1000 includes an MFP 1 and a server device 3. The MFP 1 is connected to the server device 3 via a communication line 40. The communication line 40 may perform wired communications or wireless communications and is a network, such as the Internet, or a telephone line, for example.

While the number of MFPs connected to the server device 3 is one in FIG. 1, it is not limited thereto. The number of MFPs may be set to a desired number.

As illustrated in FIG. 1, the MFP 1 includes a main body 10 and an operating unit 20. The main body 10 is a device that can carry out various types of functions, such as a copier function, a scanner function, a facsimile function, and a printer function. The main body 10 according to the present embodiment has at least a scanner function. The operating unit 20 receives input corresponding to an operation performed by a user and displays various types of images, for example. The main body 10 and the operating unit 20 are communicably connected to each other via a dedicated communication path 66. While the communication path 66 may be a path conforming to a universal serial bus (USB) standard, for example, it may be a wired or wireless path conforming to a desired standard.

The main body 10 can perform an operation corresponding to input received by the operating unit 20. An external device 2, such as a client personal computer (PC), is also connected to the communication line 40. The MFP 1 and the server device 3 may perform an operation corresponding to an instruction received from the external device 2 via the communication line 40.

The hardware configuration of the main body 10 will be described. As illustrated in FIG. 1, the main body 10 includes a central processing unit (CPU) 11, a read only memory (ROM) 12, a random access memory (RAM) 13, a hard disk drive (HDD) 14, a connection interface (I/F) 16, and an engine 17. These units are connected to one another via a system bus 18.

The CPU 11 collectively controls operations of the main body 10. The CPU 11 controls the entire operation of the main body 10 by executing a computer program stored in the ROM 12, the HDD 14, or the like using the RAM 13 as a work area. Thus, the main body 10 carries out various types of functions, such as the copier function, the scanner function, the facsimile function, and the printer function.

The connection I/F 16 is used to communicate with the operating unit 20 via the communication path 66.

The engine 17 is a hardware that performs processing other than general-purpose information processing and communications to carry out the copier function, the scanner function, the facsimile function, and the printer function. The engine 17 according to the present embodiment includes a reading unit 17A and an output unit 17B. The reading unit 17A is a known device that carries out the scanner function. The reading unit 17A scans and reads an image on a document to output image data. The output unit 17B is a known device that carries out the printer function. The output unit 17B performs printing on a recording medium, such as a sheet.

The engine 17 may further include specific options, such as a finisher that sorts printed recording media and an automatic document feeder (ADF) that automatically feeds the document.

The hardware configuration of the operating unit 20 will be described. As illustrated in FIG. 1, the operating unit 20 includes a CPU 21, a ROM 22, a RAM 23, a flash memory 24, a communication I/F 25, a connection I/F 26, an operation panel 27, and a connection I/F 30. These units are connected to one another via a system bus 28.

The CPU 21 collectively controls operations of the operating unit 20. The CPU 21 controls the entire operation of the operating unit 20 by executing a computer program stored in the ROM 22, the flash memory 24, or the like using the RAM 23 as a work area. Thus, the operating unit 20 carries out various types of functions, such as display of information (image) corresponding to input received from the user, which will be described later.

The flash memory 24 may be an HDD or a storage medium provided separately from the operating unit 20.

Out of functional units (described later in detail) to carry out these functions, at least a display control unit, an authenticating unit, an acquiring unit, an extracting unit, an allocating unit, and a generating unit, which will be described later, may be provided by a processor, such as the CPU, executing a computer program, that is, as software. Alternatively, they may be provided as hardware, such as an integrated circuit (IC), or as a combination of software and hardware.

The communication I/F 25 is used to communicate with the server device 3 via the communication line 40. The connection I/F 26 is used to communicate with the main body 10 via the communication path 66. The connection I/F 30 is used to communicate with an IC card reading device 64. The IC card reading device 64 reads information recorded in an IC part, a magnetic tape, and the like on an IC card. The IC card reading device 64 is a known IC reader, for example.

The operation panel 27 receives various types of input corresponding to operations performed by the user and displays various types of information. While the operation panel 27 in this example is a liquid-crystal display device (LCD) having a touch panel function, it is not limited thereto. The operation panel 27 may be an organic electroluminescence (EL) display device having a touch panel function, for example. In addition to or instead of this, the operation panel 27 may include an operating unit, such as a hardware key, and a display unit, such as a lamp. While the operation panel 27 according to the present embodiment integrally includes both an acceptance function to accept various types of input and a display function to display various types of information, the configuration is not limited thereto. The operation panel 27 may separately include a device that accepts various types of input and a device that displays various types of information, for example.

To maintain the independence of the functions in the present embodiment, software on an operating system (OS)

layer in the main body 10 is different from software on the OS layer in the operating unit 20. In other words, the main body 10 and the operating unit 20 independently operate with the respective OSs. The software on the OS layer in the main body 10 may be Linux (registered trademark), whereas the software on the OS layer in the operating unit 20 may be Android (registered trademark), for example.

In other words, the main body 10 and the operating unit 20 in the MFP 1 according to the present embodiment are operable with the respective OSs. Therefore, communications between the main body 10 and the operating unit 20 are not communications between processes in a single device but communications between different devices. Specifically, the communications correspond to an operation (command communications) of transmitting input (contents of an instruction from the user) received by the operating unit 20 to the main body 10 and an operation of transmitting an event from the main body 10 to the operating unit 20, for example. By performing the command communications with the main body 10, the operating unit 20 can use the functions of the main body 10. Examples of the event transmitted from the main body 10 to the operating unit 20 include an execution state of an operation in the main body 10 and contents set in the main body 10.

In the present embodiment, electric power is supplied to the operating unit 20 from the main body 10 via the communication path 66. This configuration can perform power-supply control on the operating unit 20 separately from (independently of) power-supply control on the main body 10.

The hardware configuration of the server device 3 will be described. As illustrated in FIG. 1, the server device 3 includes a CPU 31, a ROM 32, a RAM 33, an HDD 34, a communication I/F 35, and a user interface (UI) 39. These units are connected to one another via a system bus 38.

The CPU 31 collectively controls operations of the server device 3. The CPU 31 controls the entire operation of the server device 3 by executing a computer program stored in the ROM 32, the HDD 34, or the like using the RAM 33 as a work area. Thus, the CPU 31 carries out various types of functions, which will be described later. The communication I/F 35 is used to communicate with the operating unit 20 via the communication line 40.

The UI 39 receives various types of input corresponding to operations performed by the user and displays various types of information. The UI 39 includes a display unit 39A that displays various types of images and an input unit 39B that accepts various types of input corresponding to operations performed by the user. The UI 39 is similar to the operation panel 27.

Figure 2:
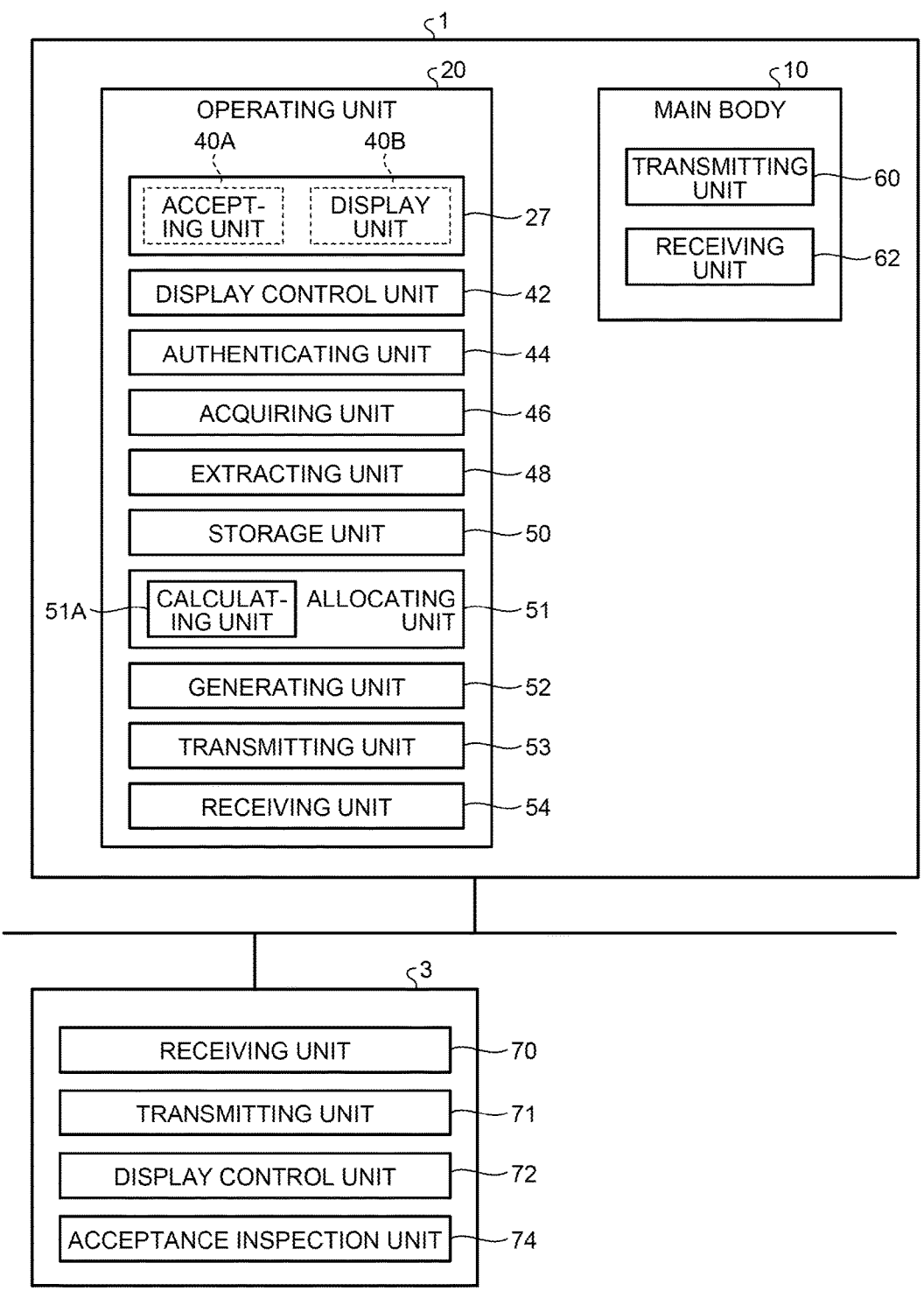
FIG. 2 is a diagram illustrating an exemplary functional configuration of an MFP and a server device.

The functional configuration of the MFP 1 and the server device 3 will be described. FIG. 2 is an exemplary functional configuration of the MFP 1 and the server device 3 according to the present embodiment. The following mainly describes a function relating to settlement mountable on the MFP 1.

The settlement includes reading an image on a document on which items and the like relating to the settlement are printed, allocating the items relating to the settlement to respective character strings included in image data of the image, and transmitting settlement information to the server device 3, the external device 2, and the like. The settlement will be described later in detail. The settlement information is used for acceptance inspection, which will be described later. The settlement information includes character strings included in image data, items allocated to the character strings, and identification information of the user.

The functions of the MFP 1 will be described. As illustrated in FIG. 2, the main body 10 includes a transmitting unit 60 and a receiving unit 62. The receiving unit 62 receives various types of information from the operating unit 20, the server device 3, and the external device 2, for example. The receiving unit 62 according to the present embodiment receives a reading instruction for a document image from the operating unit 20. When receiving the reading instruction, the reading unit 17A (not illustrated in FIG. 2) reads an image on a document placed on a document table, which is not illustrated, thereby acquiring image data of the image. The transmitting unit 60 transmits various types of information and signals to the operating unit 20. The transmitting unit 60 according to the present embodiment transmits the image data acquired by the reading unit 17A to the operating unit 20.

The operating unit 20 includes an accepting unit 40A, a display unit 40B, a display control unit 42, an authenticating unit 44, an acquiring unit 46, an extracting unit 48, a storage unit 50, an allocating unit 51, a generating unit 52, a transmitting unit 53, and a receiving unit 54.

The accepting unit 40A accepts various types of input. In this example, the accepting unit 40A accepts input of various types of information made by a touch operation performed by the user on a screen (surface on which an image is displayed) of the operation panel 27 having a touch panel function. The accepting unit 40A according to the present embodiment accepts input of various types of information including identification information for identifying the user of the main body 10, for example.

The display unit 40B displays various types of images. The operation panel 27 according to the present embodiment integrally includes the display unit 40B and the accepting unit 40A.

The display control unit 42 performs control for displaying various types of images on the display unit 40B. Examples of the various types of images include a confirmation screen that urges the user to make a confirmation, which will be described later in detail.

The storage unit 50 stores therein various types of information. The storage unit 50 according to the present embodiment stores therein user information, allocation information, and code management information, for example.

The user information is a table that associates identification information of the user who uses the main body 10 with attribute information of the user. The identification information of the user stored in the user information is identification information of the user registered in advance as a user who can use the main body 10 or perform settlement, which will be described later. The user information may be a table that further associates a password with the identification information of the user and the attribute information of the user.

FIG. 3 is a diagram illustrating an example of a data structure of the user information. The identification information simply needs to be capable of uniquely identifying the user. The attribute information is information on the user. In the example in FIG. 3, the attribute information includes a user name of a user identified by the identification information, a department code indicating a department to which the user belongs, and a budget code indicating a budget possibly used by the user. The attribute information is not limited to these pieces of information. The user information is registered in advance by an operation performed by the user on the operation panel 27, for example. The user information can be appropriately changed by an operational instruction issued by the user through the operation panel 27, for example. The user information may be updated for each predetermined period by a server device or the like, which is not illustrated, via the communication line 40.

The allocation information is a table that associates an item relating to settlement, second position information on the item on a document, and a second form of the item with one another for each format corresponding to the form of the document.

The document used for settlement is an original document for the settlement used by the user to request an administrator or the like belonging to an accounting department to settle accounts. While examples of the document include receipts, statements of delivery, bills, estimates, purchase orders, and vouchers, the document is not limited thereto. The document may be any one of receipts, bills, estimates, purchase orders, and vouchers available in countries over the world and between countries, for example, and is not limited to those available in Japan. The document may be an invoice (a shopping invoice, a commercial invoice, a customs invoice, and a proforma invoice), for example.

These documents have different formats of entry positions and forms of the items depending on the source of the receipt and the type of the document, for example.

To address this, the storage unit 50 according to the present embodiment stores therein in advance allocation information for each of a plurality of types of formats. The allocation information associates an item relating to settlement, the second position information on the item on a document, and the second form of the item in the document (e.g., a receipt) of each format with one another. The allocation information can be appropriately updated and changed by an operational instruction issued by the user through the operation panel 27 (described later in detail), for example.

FIG. 4 is a diagram illustrating an example of a data structure of the allocation information. As illustrated in the example in FIG. 4, the allocation information is a table that associates an item relating to settlement, the second position information on the item on the document, and the second form of the item with one another for each piece of format identification information. In the example in FIG. 4, the second form is not illustrated.

The format identification information is information for uniquely identifying each format. The format identification information according to the present embodiment includes a format number and a format name. While the format name is a company name that uses the format, for example, it is not limited thereto.

The format identification information may include one of the format number and the format name or further include other information.

The item relating to settlement is a section resulting from classification of information required for the settlement based on predetermined classification criteria. The items include a price, a date, an object, and a claimant, for example. The item relating to settlement may further include other information (sections) used for the settlement. The item relating to settlement may further include time for payment, a payee, an order date, the number of objects, a tax rate, a unit price, and a total price, for example. The item simply needs to be an item relating to settlement and is not limited to the items described above.

The second position information is information for specifying the position of each item on the document. The second position information according to the present embodiment indicates an area occupied by each item on the document with position coordinates.

In the example in FIG. 4, assuming that the upper left end of the document is an origin and that an area occupied by each item on the document is a rectangular area, the allocation information sets the coordinates of the rectangular area as the second position information on each item. The coordinates include a coordinate in the X-axis direction of a start position of the rectangular area, a coordinate in the Y-axis direction of the start position, a coordinate in the X-axis direction of an end position, and a coordinate in the Y-axis direction of the end position. The end position corresponds to the position of the corner positioned diagonally to the start position in the rectangular area.

Figure 5:
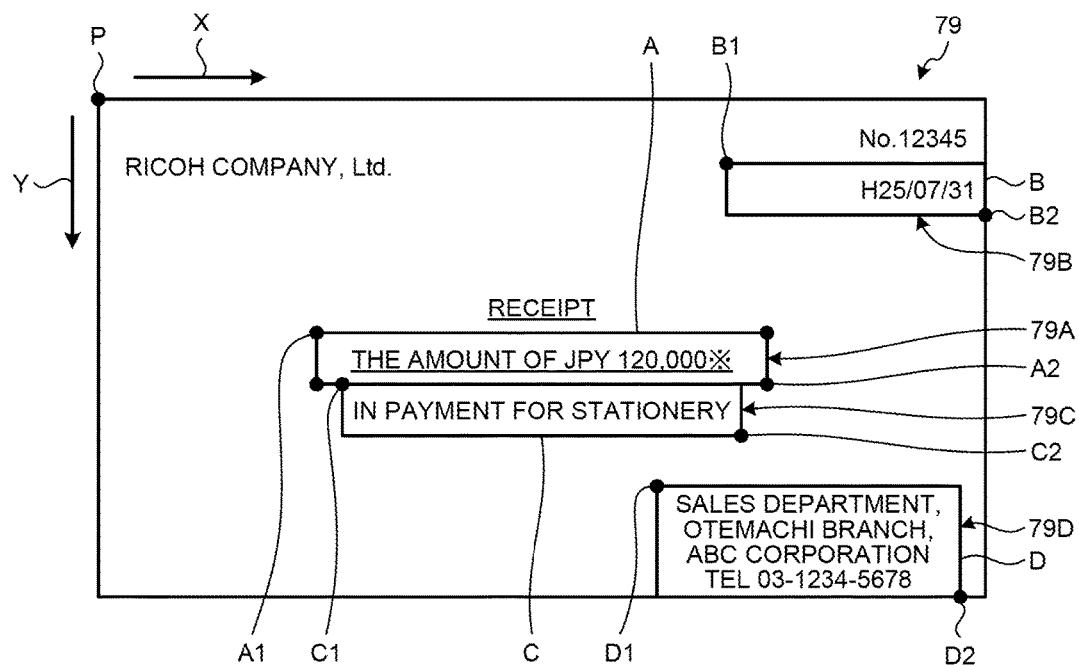
FIG. 5 is a diagram for explaining second position information on each item.

FIG. 5 is a diagram for explaining the second position information on each item on a document 79 with a certain format registered in the allocation information. FIG. 5 illustrates a positional relation of the items on a document with a format of a format number "0002" illustrated in FIG. 4, for example. In FIG. 5, a receipt available in Japan is used as the document, for example.

The second position information on an item "price" 79A indicates a rectangular area A represented by (a coordinate in the X-axis direction of a start position A1, a coordinate in the Y-axis direction of the start position A1, a coordinate in the X-axis direction of an end position A2, and a coordinate in the Y-axis direction of the end position A2) assuming the upper left end of the document 79 is an origin P. The second position information on the item "price" 79A is represented by (200, 150, 300, 200), for example (refer to FIG. 4). The second position information on an item "date" 79B indicates a rectangular area B represented by (a coordinate in the X-axis direction of a start position B1, a coordinate in the Y-axis direction of the start position B1, a coordinate in the X-axis direction of an end position B2, and a coordinate in the Y-axis direction of the end position B2) assuming the upper left end of the document 79 is the origin P. The second position information on the item "date" 79B is represented by (400, 10, 480, 30), for example (refer to FIG. 4).

The second position information on an item "object" 79C indicates a rectangular area C represented by (a coordinate in the X-axis direction of a start position C1, a coordinate in the Y-axis direction of the start position C1, a coordinate in the X-axis direction of an end position C2, and a coordinate in the Y-axis direction of the end position C2) assuming the upper left end of the document 79 is the origin P. The second position information on the item "object" 79C is represented by (200, 210, 300, 240), for example (refer to FIG. 4). The second position information on an item "claimant" 79D indicates a rectangular area D represented by (a coordinate in the X-axis direction of a start position D1, a coordinate in the Y-axis direction of the start position D1, a coordinate in the X-axis direction of an end position D2, and a coordinate in the Y-axis direction of the end position D2) assuming the upper left and of the document 79 is the origin P. The second position information on the item "claimant" 79D is represented by (350, 260, 480, 320), for example (refer to FIG. 4).

The second form, which is not illustrated in FIG. 4, is set for each item. The second form indicates a form and a style of each item. Specifically, the second form of the item "price" is "JPY XXX,XXX" or "XXX,XXX yen". The form of the item "date" is "XXXX/XX/XX (year/month/day)" or "Heisei XX/XX/XX (year/month/day)", for example. In the allocation information, one item may be associated with one second form or a plurality of types of second forms.

The code management information stored in the storage unit 50 will be described. The code management information is a table that associates, in a case where each item set in the allocation information is further classified into a plurality of sub-items, each sub-item with a code (identification information of the sub-item).

The code management information includes code management information on sub-items of the item "object" and code management information on sub-items of the item "claimant", for example.

FIG. 6 is a diagram of an example of a data structure of the code management information on sub-items of the item "object". The code management information illustrated in FIG. 6 is a table that associates the sub-items of the item "object" with respective object codes. While FIG. 6 illustrates stationery, a ballpoint pen, a sheet, a keyboard, a mouse, expenses for food and drink, charges for food and drink as the sub-items of the item "object", they are not limited thereto.

FIG. 7 is a diagram illustrating an example of a data structure of the code management information on sub-items of the item "claimant". The code management information illustrated in FIG. 7 is a table that associates the sub-items of the item "claimant" with respective claimant codes. While FIG. 7 illustrates company's names and the like as the sub-items of the item "claimant", they are not limited thereto.

The various types of information stored in the storage unit 50 can be appropriately updated and changed by an operational instruction issued by the user through the operation panel 27, for example. The various types of information stored in the storage unit 50 may be stored in the server device 3 and the external device 2 and appropriately read and used by the MFP 1 as needed.

Referring back to FIG. 2, the explanation will be continued.

The authenticating unit 44 receives the identification information of the user from the operation panel 27 or the IC card reading device 64 (refer to FIG. 1). The authenticating unit 44 determines whether or not the received identification information of the user is registered in the user information (refer to FIG. 3), thereby performing authentication. If the received identification information of the user is registered in the user information, the authenticating unit 44 generates an authentication result indicating normal authentication. By contrast, if the received identification information of the user is not registered in the user information, the authenticating unit 44 generates an authentication result indicating abnormal authentication.

Let us assume that the authenticating unit 44 receives the identification information and the password of the user from the operation panel 27 or the IC card reading device 64 (refer to FIG. 1). In this case, the authenticating unit 44 determines whether or not the received identification information and password of the user are stored in the user information in a manner associated with each other, thereby performing authentication.

The acquiring unit 46 acquires image data of an image on a document read by the reading unit 17A of the main body 10 from the main body 10.

The extracting unit 48 extracts character string information from the image data acquired by the acquiring unit 46. The character string information includes a character string in the image on the document, first position information on the character string in the image, and a first form of the character string. The character string is a group of characters written in the same form. The character string may be a group of characters written in the same form in one row in the row direction or a group of characters written in a plurality of rows. The image data includes one or a plurality of character strings. The character string information includes at least the character string included in the image on the document and the first position information on the character string. The character string information may further include other information for identifying the character string.

The extracting unit 48 is a known optical character reader (OCR), an electronic device having an OCR function, or a functional unit (computer program) loaded with an OCR program, for example. The extracting unit 48 may extract the character string using a known character recognition technology. The extracting unit 48 may extract the first form of the character string by storing in advance a plurality of types of forms in a memory or the like, which is not illustrated, and comparing the extracted character string with the forms stored in the memory. The first position information on the character string in the image is acquired by a known technology.

The first position information on the character string in the image is information for specifying the position of each item in the image on the document. The first position information according to the present embodiment indicates an area occupied by each item in the image on the document with position coordinates. The method for indicating an area occupied by each item with position coordinates is the same as that for the second position information mentioned above.

The first form of the character string in the image indicates a form and a style of the character string. The form and the style are the same as those of the second form mentioned above. The extracting unit 48 extracts one form for one character string as the first form from the image data of the image on the document.

Based on a comparison result obtained by comparing the allocation information (refer to FIG. 4) with the character string information extracted from the image data, the allocating unit 51 allocates the item specified by the allocation information to the character string included in the character string information.

The allocating unit 51 includes a calculating unit 51A. The calculating unit 51A calculates the agreement indicating the degree of agreement between the character string information and the allocation information as the comparison result for each format corresponding to the style (form) of the document.

Figure 8:
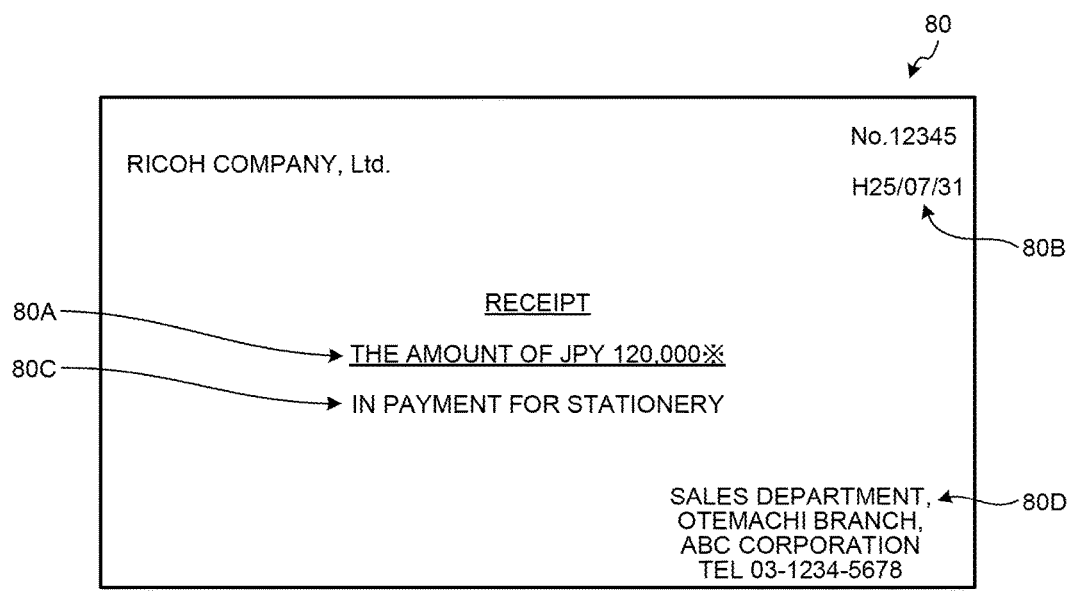
FIG. 8 is a diagram for explaining an example of image data of an image of a document.

FIG. 8 is a diagram for explaining an example of image data of an image 80 on a document acquired by the acquiring unit 46. In FIG. 8, a receipt available in Japan is used as the document, for example. Let us assume that the user places a receipt (document) on a placing table, which is not illustrated, of the MFP 1, for example. The MFP 1 then reads the receipt and transmits the image data of the image 80 of the receipt (document) to the operating unit 20.

In this case, the extracting unit 48 extracts character strings in the image 80, including "H25/07/31" 80B, "receipt", "the amount of JPY 120,000" 80A, "in payment for stationery" 80C, and "ABC Corporation" 80D, for example. At this time, the extracting unit 48 also extracts the first position information in the image 80 and the first form of each character string. Thus, the extracting unit 48 extracts the character string information from the image 80.

The calculating unit 51A calculates the agreement between the allocation information and the character string information for each format stored in the storage unit 50. Specifically, the calculating unit 51A determines, for each item included in the allocation information corresponding to each format, whether or not the character string included in the character string information is present in an area specified by the second position information on the item. More specifically, the calculating unit 51A makes the determination by determining whether or not the character string corresponding to the first position information included in the area specified by the second position information is included in the character string information.

If the character string is present in the area specified by the second position information, the calculating unit 51A adds a predetermined number (e.g., "1") to a calculation coefficient A of the agreement. The calculation coefficient A is reset to an initial value (e.g., "0") before the calculation of the agreement of each format. The calculating unit 51A determines whether the second form of the item corresponding to the second position information agrees with the first form of the character string present in the area specified by the second position information. If these forms (the second form and the first form) agree with each other, the calculating unit 51A further adds a predetermined number (e.g., "1") to the calculation coefficient A. The calculating unit 51A performs the series of processing on all the items included in the allocation information of each format. Thus, the calculating unit 51A calculates the final value of the calculation coefficient A as the agreement between the allocation information corresponding to each format and the character string information.

The allocating unit 51 allocates the items included in the allocation information of a format having agreement equal to or larger than a predetermined threshold to respective character strings included in the character string information at positions corresponding to the items. The threshold is set in advance and can be appropriately changed by an operational instruction issued by the user through the operation panel 27, for example.

Figure 9:
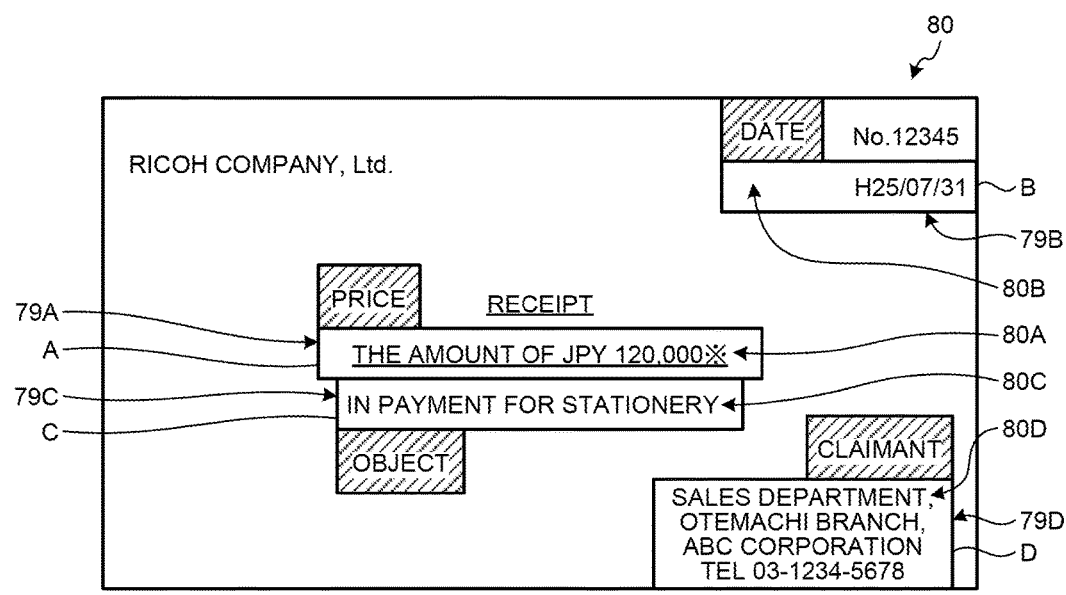
FIG. 9 is a diagram for explaining a state where items are allocated to character strings included in the image.

FIG. 9 is a diagram for explaining a state where the items are allocated to the character strings included in the image 80 illustrated in FIG. 8. Let us assume that the allocating unit 51 compares the character string information extracted from the image 80 with the allocation information corresponding to the format (refer to FIG. 5) of the format number "0002" illustrated in FIG. 4, for example.

In this case, as illustrated in FIG. 9, an area specified by the first position information on the character string "H25/07/31" 80B included in the image 80 is positioned in the rectangular area B specified by the second position information on the item "date" 79B (refer to FIG. 5). In addition, the first form agrees with the second form. Thus, the allocating unit 51 allocates the item "date" to the character string "H25/07/31" 80B. Similarly, an area specified by the first position information on the character string "the amount of JPY 120,000" 80A included in the image 80 is positioned in the rectangular area A specified by the second position information on the item "price" 79A (refer to FIG. 5). In addition, the first form agrees with the second form. Thus, the allocating unit 51 allocates the item "price" to the character string "the amount of JPY 120,000" 80A.

An area specified by the first position information on the character string "in payment for stationery" 80C included in the image 80 is positioned in the rectangular area C specified by the second position information on the item "object" 79C (refer to FIG. 5). In addition, the first form agrees with the second form. Thus, the allocating unit 51 allocates the item "object" to the character string "in payment for stationery" 80C. Similarly, an area specified by the first position information on the character string "ABC Corporation" 80D included in the image 80 is positioned in the rectangular area D specified by the second position information on the item "claimant" 79D (refer to FIG. 5). In addition, the first form agrees with the second form. Thus, the allocating unit 51 allocates the item "claimant" to the character string "ABC Corporation" 80D.

In the allocation, the allocating unit 51 may convert the character string into a string having the number of characters and a character form based on the item corresponding thereto. Specifically, the allocating unit 51 may allocate a character string "JPY 120,000" out of the character string "the amount of JPY 120,000" to the item "price".

Referring back to FIG. 2, the generating unit 52 generates a confirmation screen that indicates the allocation result of the items to the character strings and various types of screens. The display control unit 42 performs control for displaying the confirmation screen and the various types of screens generated by the generating unit 52 on the display unit 40B.

The transmitting unit 53 transmits settlement information and various types of information to the server device 3. The settlement information includes information required for settlement. Specifically, the settlement information includes a character string, an item allocated to the character string, and the identification information of the user. The identification information of the user is the identification information of the user authenticated by the authenticating unit 44. The settlement information may further include the second position information on a character string, the second form of the character sting, and format identification information of a format corresponding thereto, for example.

The receiving unit 54 receives various types of information and instruction signals from the main body 10, the external device 2, and the server device 3, for example.

The server device 3 includes a receiving unit 70, a transmitting unit 71, a display control unit 72, and an acceptance inspection unit 74.

The receiving unit 70 receives various types of information from various types of devices connected to the communication line 40. The receiving unit 70 according to the present embodiment receives settlement information from the MFP 1. The transmitting unit 71 transmits various types of information to various types of devices via the communication line 40.

Based on the settlement information received from the MFP 1, the display control unit 72 performs control for displaying a confirmation screen for the settlement information on the display unit 39A (refer to FIG. 1).

The acceptance inspection unit 74 carries out acceptance inspection using the settlement information received from the MFP 1. The acceptance inspection is predetermined processing required for settlement (e.g., calculation of charges to be paid to a claimant and creation of a slip) using character strings corresponding to respective items relating to settlement included in the settlement information.

The following describes the settlement performed by the information processing system 1000 according to the present embodiment.

Figure 10:
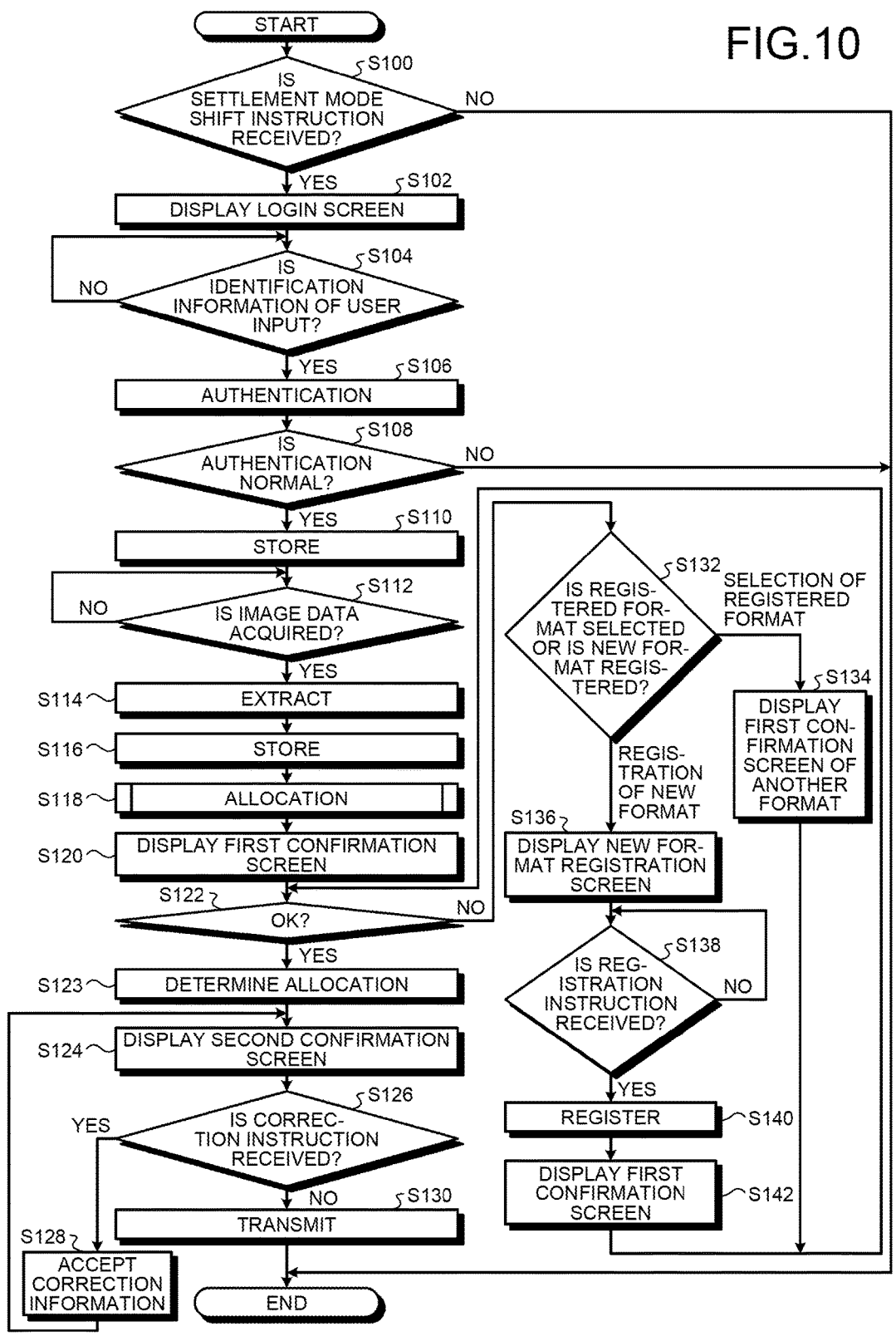
FIG. 10 is a flowchart illustrating a process of settlement.

FIG. 10 is a flowchart of a process of the settlement performed by the operating unit 20.

The accepting unit 40A determines whether or not it has received input of a settlement mode shift instruction (Step S100). The settlement mode shift instruction is issued as follows: when a predetermined specific area on the operation panel 27 or a specific key, which is not illustrated, provided to the operation panel 27 is pressed by an operational instruction issued by the user, the operation panel 27 outputs a signal indicating a settlement mode shift instruction to the accepting unit 40A, for example. The accepting unit 40A determines whether or not it has received the signal, thereby making the determination at Step S100.

If the determination result at Step S100 is negative (No at Step S100), the present routine is terminated. By contrast, if the determination result at Step S100 is affirmative (Yes at Step S100), the process proceeds to Step S102.

At Step S102, the display control unit 42 performs control for displaying a login screen on the display unit 40B (Step S102). The login screen includes information that urges the user to log in, an instruction button to instruct cancellation of login, and an instruction button to instruct execution of login, for example. If a display area of the instruction button to instruct execution of login is pressed by an operational instruction issued by the user through the operation panel 27, the display control unit 42 performs control for displaying an input screen to input the identification information and the password of the user on the display unit 40B.

The accepting unit 40A repeatedly makes a negative determination until it determines that the identification information of the user is input (No at Step S104). As described above, the accepting unit 40A may repeatedly make a negative determination until it determines that the identification information and the password of the user are input (No at Step S104).

If the accepting unit 40A determines that the identification information of the user is input (Yes at Step S104), the process proceeds to Step S106. At Step S106, the authenticating unit 44 performs authentication (Step S106). The authenticating unit 44 generates an authentication result indicating normal authentication or abnormal authentication.

The authenticating unit 44 determines whether or not the generated authentication result is normal authentication (Step S108). If the authenticating unit 44 determines that the authentication is abnormal (No at Step S108), the present routine is terminated. By contrast, if the authenticating unit 44 determines that the authentication is normal (Yes at Step S108), the authenticating unit 44 stores the identification information of the user acquired at Step S104 in the storage unit 50 (Step S110).

The acquiring unit 46 determines whether or not it has acquired image data of an image on a document from the main body 10 (Step S112). The display control unit 42, for example, performs control for displaying, on the display unit 40B, a message urging the user to place a document serving as a settlement target on a placing table, which is not illustrated, of the main body 10. The user places the document on the placing table and issues an operational instruction through the operation panel 27, whereby the accepting unit 40A accepts an instruction signal indicating start of reading. If the accepting unit 40A accepts the instruction signal, the transmitting unit 53 transmits the instruction signal indicating start of reading to the reading unit 17A of the main body 10. When receiving the instruction signal, the reading unit 17A reads an image on the document placed on the placing table and transmits image data of the image on the document to the operating unit 20.

The acquiring unit 46 determines whether or not it has received the image data from the main body 10, thereby making a determination at Step S112. The acquiring unit 46 repeatedly makes a negative determination until it acquires the image data from the main body 10 (No at Step S112). If the acquiring unit 46 acquires the image data (Yes at Step S112), the process proceeds to Step S114.

At Step S114, the extracting unit 48 extracts character string information from the image data (Step S114). As described above, the character string information includes character strings in the image, the first position information on the character strings in the image, and the first form of the character strings. The extracting unit 48 stores the extracted character string information in the storage unit 50 (Step S116).

The allocating unit 51 performs allocation (Step S118). The allocation is processing of comparing the character string information extracted at Step S114 with allocation information corresponding to each format stored in the storage unit 50 to allocate items to the respective character strings included in the character string information.

Figure 11:
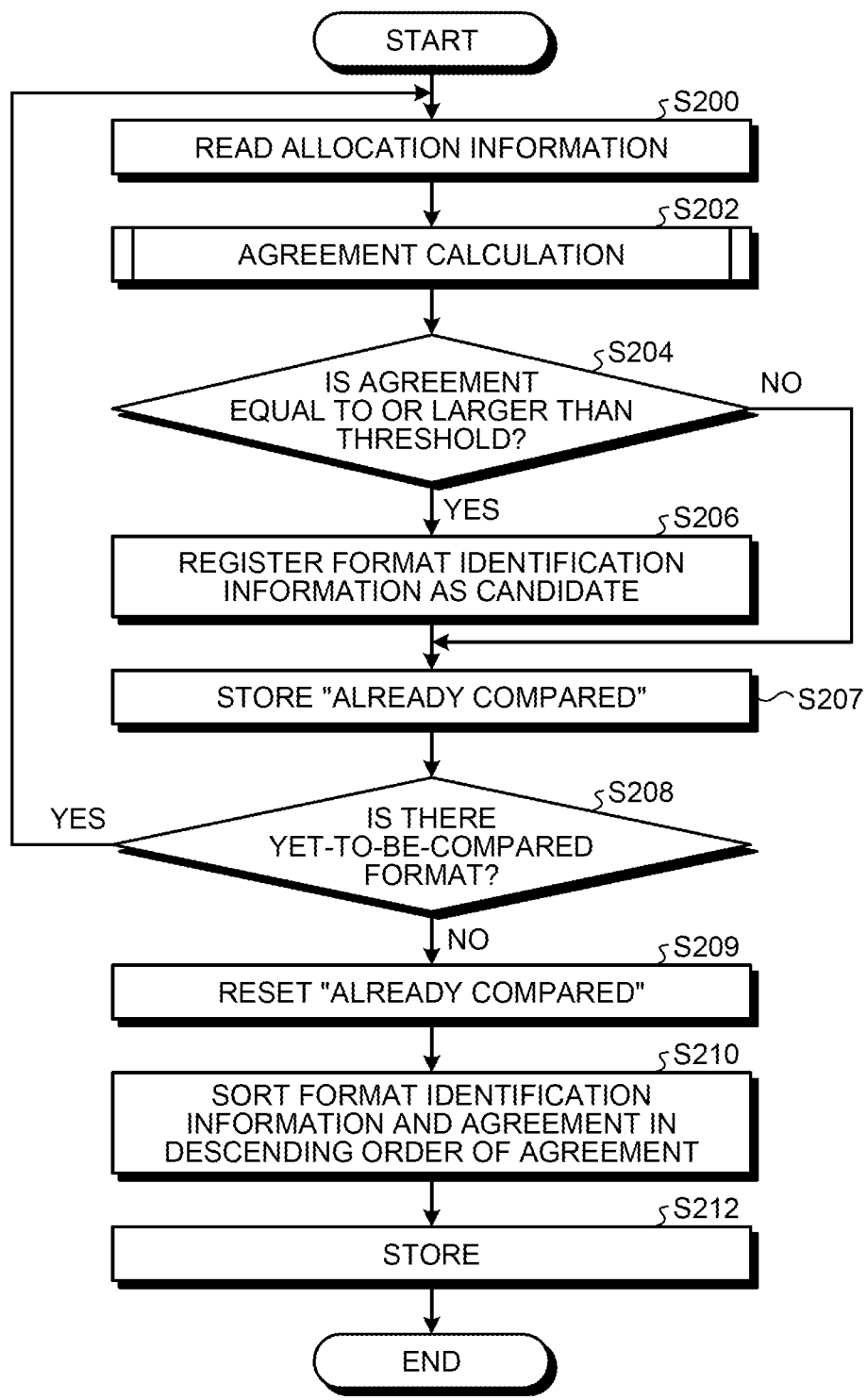
FIG. 11 is a flowchart illustrating a process of allocation.

FIG. 11 is a flowchart of a process of the allocation (refer to Step S118 in FIG. 10).

The allocating unit 51 reads allocation information corresponding to a yet-to-be-compared format out of a plurality of pieces of allocation information stored in the storage unit 50 (Step S200). The allocating unit 51 reads one piece of allocation information corresponding to format identification information not associated with information indicating "already compared" out of the of pieces of allocation information corresponding to a plurality of pieces of format identification information, thereby performing the processing at Step S200.

The calculating unit 51A of the allocating unit 51 performs agreement calculation (Step S202). At Step S202, the calculating unit 51A calculates the agreement between the character string information extracted at Step S114 (refer to FIG. 10) and the allocation information read at Step S200.

Figure 12:
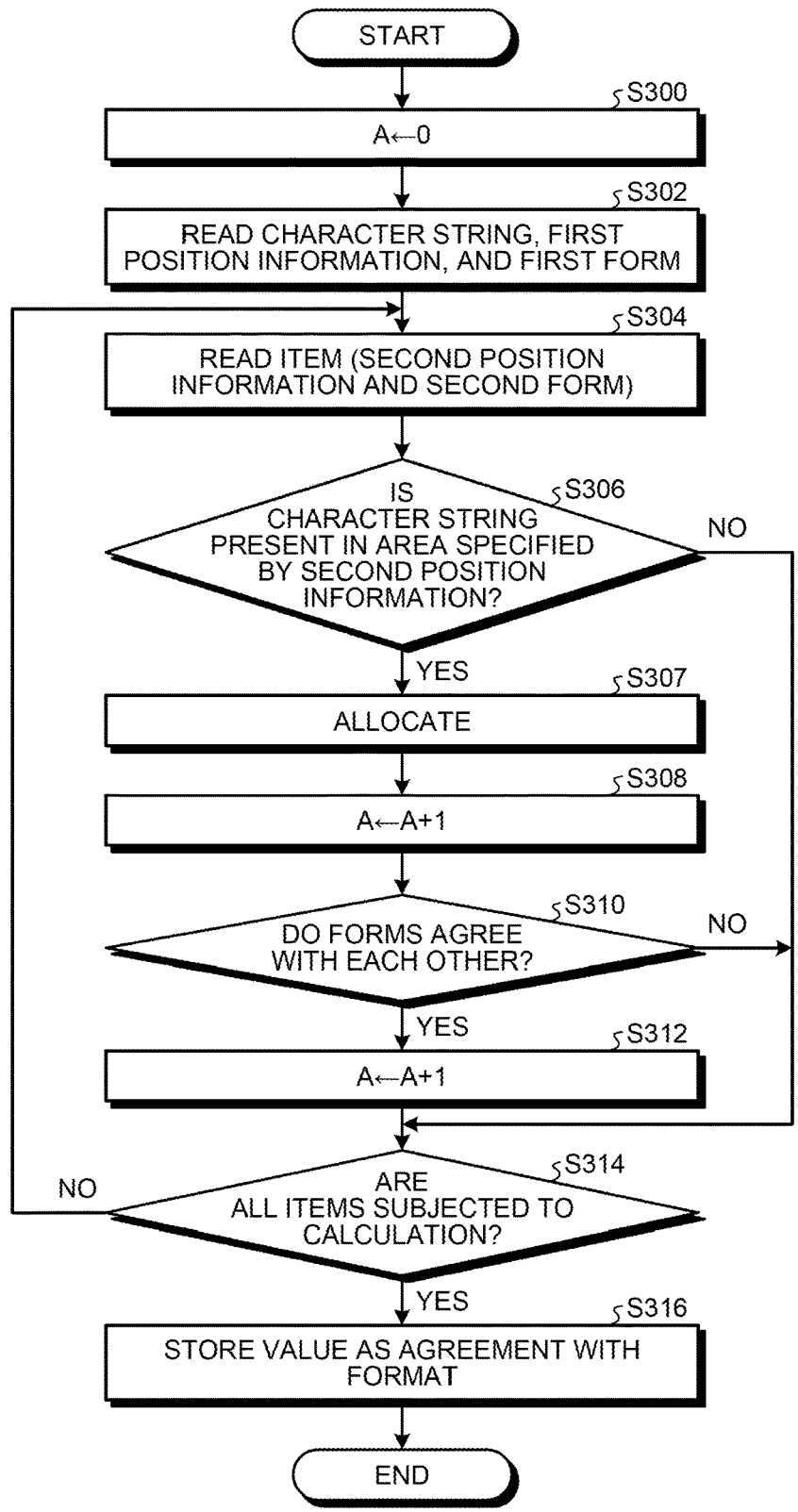
FIG. 12 is a flowchart illustrating a process of agreement calculation.

FIG. 12 is a flowchart illustrating a process of the agreement calculation at Step S202 (refer to FIG. 11).

The calculating unit 51A resets the calculation coefficient A of the agreement to an initial value "0" (Step S300). The calculating unit 51A reads the character strings, the first position information, and the first form extracted from the image data by the extracting unit 48 at Step S114 (refer to FIG. 10) (Step S302).

The calculating unit 51A reads one item yet to be subjected to the agreement calculation out of a plurality of items included in the allocation information read at Step S200 (refer to FIG. 11), the second position information on the item, and the second form of the item (Step S304).

The calculating unit 51A determines whether or not any one of the character strings read at Step S302 is present in an area specified by the second position information on the item read at Step S304 (Step S306). Specifically, the calculating unit 51A determines whether or not a character string the first position information of which indicates the area specified by the second position information is included in the character strings read at Step S302, thereby making the determination at Step S306.

If no character string is present (No at Step S306), the process proceeds to Step S314. By contrast, if a character string is present (Yes at Step S306), the process proceeds to Step S307.

At Step S307, the calculating unit 51A allocates the item read at Step S304 to the character string present in the area specified by the second position information on the item (Step S307). Specifically, the calculating unit 51A stores the character string information of the character string in association with the item read at Step S304, thereby performing the allocation.

At Step S308, the calculating unit 51A adds a predetermined number ("1" in the present embodiment) to the calculation coefficient A of the agreement (Step S308).

The calculating unit 51A determines whether or not the first form of the character string determined to be present in the area specified by the second position information at Step S306 agrees with the second form of the item of the second position information (Step S310). In other words, the calculating unit 51A determines whether or not the second form of the item read at Step S304 agrees with the first form of the character string to which the item is allocated at Step S307. If the forms do not agree with each other (No at Step S310), the calculating unit 51A performs Step S314, which will be described later. By contrast, if the forms agree with each other (Yes at Step S310), the calculating unit 51A performs Step S312.

At Step S312, the calculating unit 51A adds a predetermined number ("1" in the present embodiment) to the calculation coefficient A of the agreement (Step S312).

The calculating unit 51A determines whether or not all the items included in the allocation information read at Step S200 (refer to FIG. 11) are already subjected to the agreement calculation (Step S304 to Step S312) (Step S314). If all the items are not yet subjected to the agreement calculation (No at Step S314), the calculating unit 51A performs the processing at Step S304 again. By contrast, if all the items are already subjected to the agreement calculation (Yes at Step S314), the calculating unit 51A performs processing at Step S316.

At Step S316, the calculating unit 51A stores the final value of the calculation coefficient A calculated by the processing from Step S300 to Step S314 in the storage unit 50 in association with the format identification information of the format read at Step S200 (refer to FIG. 11) as the agreement between the allocation information of the format and the character string information extracted at Step S114 (refer to FIG. 10) (Step S316). Subsequently, the present routine is terminated.

Referring back to Step S202 in FIG. 11, the explanation will be continued. If the agreement calculation, which has been explained with reference to FIG. 12, at Step S202 in FIG. 11 is finished, the allocating unit 51 determines whether or not the agreement calculated at Step S202 is equal to or larger than a predetermined threshold (Step S204). If the agreement is smaller than the predetermined threshold (No at Step S204), the process proceeds to Step S207. By contrast, if the agreement is equal to or larger than the predetermined threshold (Yes at Step S204), the process proceeds to Step S206.

At Step S206, the calculating unit 51A registers the format identification information of the format read at Step S200 in the storage unit 50 as a candidate format to be allocated (Step S206). Specifically, the calculating unit 51A stores a flag indicating a candidate to be allocated in association with the format identification information and the agreement stored in the storage unit 50 at Step S316 (FIG. 12), for example.

The allocating unit 51 stores information indicating "already compared" in association with the format identification information corresponding to the allocation information on which the processing from Step S202 to Step S206 is performed out of the pieces of allocation information stored in the storage unit 50 (Step S207).

The allocating unit 51 determines whether or not there is a yet-to-be-compared format in the pieces of allocation information corresponding to the respective formats stored in the storage unit 50 (Step S208). The allocating unit 51 determines whether or not there is format identification information not associated with information indicating "already compared" in the pieces of format identification information corresponding to the pieces of allocation information stored in the storage unit 50, thereby making the determination at Step S208.

If there is a yet-to-be-compared format (Yes at Step S208), the process is returned to Step S200. By contrast, if there is no yet-to-be-compared format (No at Step S208), the process proceeds to Step S209.

The allocating unit 51 deletes the information indicating "already compared" associated with the format identification information in the storage unit 50, thereby resetting "already compared" (Step S209).

The allocating unit 51 rearranges (sorts) the pieces of format identification information and the agreement associated with the flag indicating a candidate to be allocated in descending order of agreement (Step S210).

The allocating unit 51 stores the pieces of format identification information sorted in descending order of agreement in the storage unit 50 (Step S212).

By performing the processing from Step S200 to Step S212, the allocation is carried out.

Referring back to Step S120 in FIG. 10, the explanation will be continued. The display control unit 42 performs control for displaying a first confirmation screen on the display unit 40B (Step S120). On the first confirmation screen, the items included in the allocation information are allocated to the respective character strings included in the character string information extracted at Step S114. The first confirmation screen is generated by the generating unit 52.

Specifically, the generating unit 52 reads allocation information corresponding to the format identification information having the highest agreement out of the pieces of format identification information having agreement equal to or larger than the threshold and sorted in descending order of agreement by the allocation at Step S118. At this time, the generating unit 52 also reads the character string information associated with the items of the allocation information by the processing at Step S307 (refer to FIG. 12). In other words, the generating unit 52 reads the character strings allocated to the respective items of the allocation information by the allocation.

The generating unit 52 generates the first confirmation screen including a superimposition image and the format identification information corresponding to the allocation information used for the allocation, for example. The superimposition image is obtained by superimposing, on the image of the image data acquired at Step S112, an image indicating the items allocated to the respective character strings included in the image.

Figure 13:
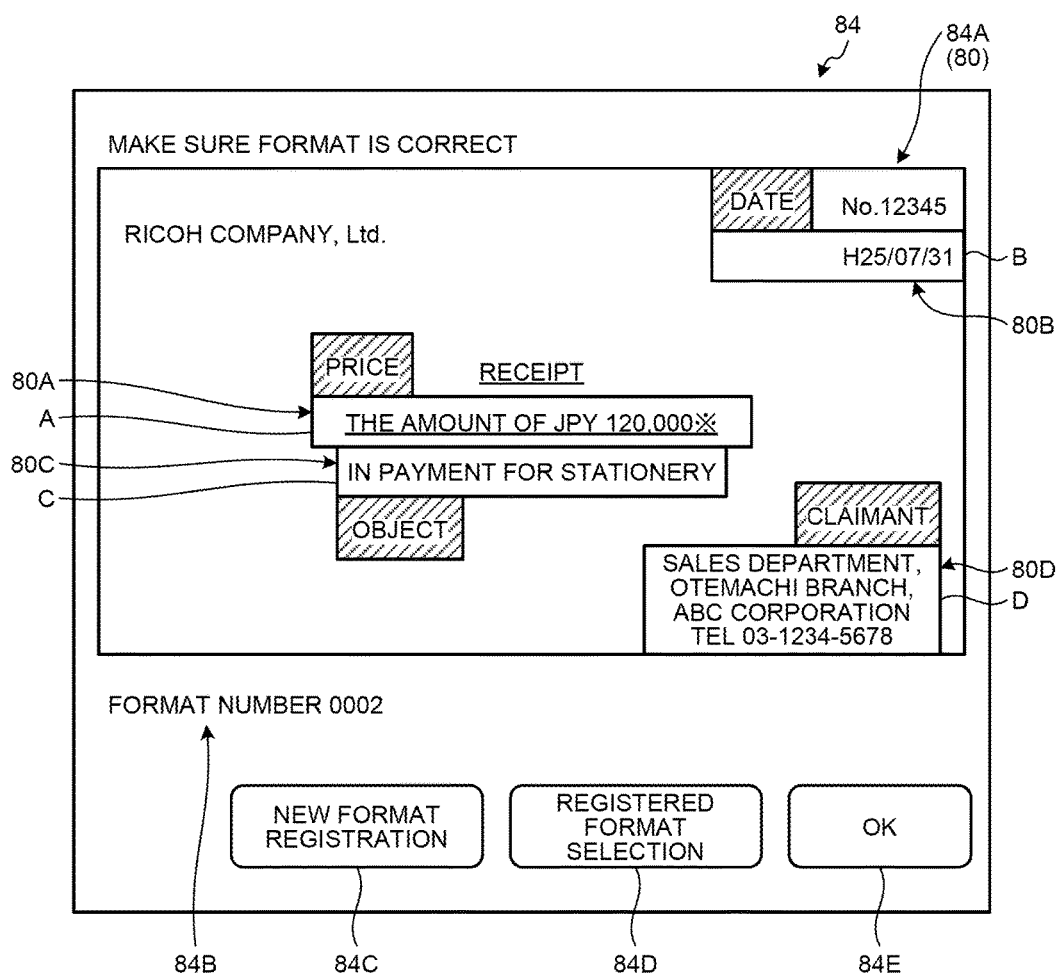
FIG. 13 is a diagram illustrating an example of a first confirmation screen.

FIG. 13 is a diagram illustrating an example of a first confirmation screen 84. FIG. 13 illustrates an example of the first confirmation screen 84 in a case where a receipt available in Japan (refer to FIG. 8, for example) is used as the document. The first confirmation screen 84 includes a superimposition image 84A, a format number 84B serving as the format identification information, a new format registration button 84C, a registered format selection button 84D, and an OK button 84E.

In the superimposition image 84A, an image B indicating the item "date" allocated to the character string "H25/07/31" 80B in the image 80 on the document is superimposed on the area of the character string 80B. In the superimposition image 84A, an image A indicating the item "price" allocated to the character string "the amount of JPY 120,000" 80A is superimposed on the area of the character string 80A. In the superimposition image 84A, an image C indicating the item "object" allocated to the character string "in payment for stationery" 80C is superimposed on the area of the character string 80C. In the superimposition image 84A, an image D indicating the item "claimant" allocated to the character string "ABC Corporation" 80D is superimposed on the area of the character string 80D.

The new format registration button 84C is selected by the user to instruct registration of a new format different from the format identified by the format number displayed on the first confirmation screen 84. The registered format selection button 84D is selected by the user to instruct selection of another registered format different from the format displayed on the first confirmation screen 84. The OK button 84E is selected by the user to approve the displayed first confirmation screen.

The display control unit 42 performs control for displaying the first confirmation screen generated by the generating unit 52 on the display unit 40B.

Referring back to FIG. 10, the display control unit 42 determines whether or not the OK button 84E is operated on the first confirmation screen 84 displayed on the operation panel 27 at Step S120 (Step S122). The display control unit 42 determines whether or not the area of the OK button 84E is operated by an operational instruction issued by the user through the operation panel 27 and whether or not a signal indicating the operation on the area of the OK button 84E is received, thereby making the determination at Step S122.

If the determination result at Step S122 is negative (No at Step S122), the process proceeds to Step S132. At Step S132, the display control unit 42 determines whether or not the new format registration button 84C or the registered format selection button 84D is operated (Step S132).

If the new format registration button 84C is operated (Step S132: registration of a new format), the process proceeds to Step S136.

At Step S136, the display control unit 42 performs control for displaying a new format registration screen on the display unit 40B (Step S136).

At Step S136, the display control unit 42 performs control for displaying a new format registration screen including the image of the image data acquired at Step S112 (that is, the image on the document) and various types of images used to set the items on the display unit 40B.

FIG. 14 is a schematic for explaining an example of a new format registration screen 88. The new format registration screen 88 includes an image 88G of a document (e.g., a receipt). FIG. 14 illustrates an example of the new format registration screen 88 including the image 88G of a document in a case where a receipt available in Japan is used as the document. The new format registration screen 88 displays diagrams used to set the items. The user, for example, operates the operation panel 27 to adjust the position and the size of a frame image 88A indicating the item "price", thereby setting the first position information on the item "price". Similarly, the user operates the operation panel 27 to adjust the position and the size of a frame image 88B indicating the item "date", thereby setting the first position information on the item "date". Similarly, the user operates the operation panel 27 to adjust the position and the size of a frame image 88D indicating the item "claimant", thereby setting the first position information on the item "claimant". Similarly, the user operates the operation panel 27 to adjust the position and the size of a frame image 88C indicating the item "object", thereby setting the first position information on the item "object". The position and the size of the frame images are adjusted by the user pinching in and pinching out and dragging and dropping them on the screen of the operation panel 27, for example.

The new format registration screen 88 includes a "cancel" button 88H and an OK button 88I. The "cancel" button 88H is operated by the user to cancel the operation. The OK button 88I is operated by the user to approve the set items.

Referring back to FIG. 10, the display control unit 42 determines whether there is a registration instruction (Step S138). The display control unit 42 determines whether it has received a signal indicating that the OK button 88I in FIG. 14 is operated, thereby making the determination at Step S138. The display control unit 42 repeatedly makes a negative determination (No at Step S138) until it determines that there is a registration instruction (Yes at Step S138). If the display control unit 42 determines that there is a registration instruction (Yes at Step S138), the process proceeds to Step S140.

At Step S140, the generating unit 52 generates allocation information from the image displayed on the display unit 40B at Step S136 and on which the items are set by the operational instruction issued by the user, creates new format identification information, and registers the allocation information in association with the format identification information in the storage unit 50 (Step S140).

Specifically, the generating unit 52 extracts the character strings to which the items are set by the processing at Step S136 out of the character strings included in the image on the document displayed on the display unit 40B by the processing at Step S136, the form of the character strings, and the position information on the character strings. The generating unit 52 then stores allocation information that associates the items, the second form serving as the form of the character strings corresponding to the items, and the second position information serving as the position information on the character strings in the storage unit 50 in association with the newly created format identification information. At this time, the allocating unit 51 stores the character string information of the character strings included in the image on the document on which the items of the allocation information are set in the storage unit 50 in association with the respective items. In addition, the allocating unit 51 appropriately updates the code management information.

If there is no format having agreement equal to or larger the threshold (that is, if the agreement with the allocation information corresponding to all the formats is smaller than the threshold) in the allocation at Step S118, the generating unit 52 may perform the processing from Step S136 to Step S140 instead of the processing at Step S120. Thus, the generating unit 52 may register allocation information corresponding to a new format in the storage unit 50.

The display control unit 42 performs control for displaying the first confirmation screen on the display unit 40B (Step S142). At Step S142, the generating unit 52 reads the allocation information corresponding to the format identification information newly registered at Step S140. At this time, the generating unit 52 also reads the character string information corresponding to each item of the allocation information by the processing at Step S140.

The generating unit 52 performs control for displaying the first confirmation screen including a superimposition image and the format identification information newly registered at Step S138 on the display unit 40B, for example. The superimposition image is obtained by superimposing, on the image of the image data acquired at Step S112, an image indicating the items allocated to the respective character strings included in the image at Step S138. The process is then returned to Step S122.

If the registered format selection button 84D is selected at Step S132 (Step S132: selection of a registered format), the process proceeds to Step S134.

At Step S134, the display control unit 42 performs control for displaying, on the display unit 40B, the first confirmation screen of a format different from the format displayed on the display unit 40B (Step S134). Specifically, the display control unit 42 performs control for displaying the first confirmation screen on which items of allocation information of the different format are allocated to the character string information extracted from the image data on the display unit 40B. The first confirmation screen is also generated by the generating unit 52.

Specifically, the generating unit 52 reads allocation information corresponding to the format identification information having the second highest agreement after the previously displayed format identification information out of the pieces of format identification information having agreement equal to or larger than the threshold and sorted in descending order of agreement by the allocation at Step S118. In a case where there is format identification information having the same agreement as that of the previously displayed format identification information or where there are a plurality of pieces of format identification information having the second highest agreement after the previously displayed format identification information, the generating unit 52 may perform the following processing. The generating unit 52 may read allocation information corresponding to one of pieces of format identification information yet to be displayed as the first confirmation screen and having the highest agreement out of the pieces of format identification information having agreement equal to or larger than the threshold and sorted in descending order of agreement by the allocation at Step S118.

At this time, the generating unit 52 also reads the character string information associated with the items of the allocation information by the processing at Step S307 (refer to FIG. 12). In other words, the generating unit 52 reads the character strings allocated to the respective items of the allocation information by the allocation.

The generating unit 52 performs control for displaying, on the displaying unit 40B, the first confirmation screen including a superimposition image and the format identification information corresponding to the allocation information used for the allocation, for example. The superimposition image is obtained by superimposing, on the image of the image data acquired at Step S112, an image indicating the items allocated to the respective character strings included in the image. The process is then returned to Step S122.

The generating unit 52 may display a message that urges the user to select one of the pieces of format identification information on the display unit 40B. If one piece of format identification information is selected by an operational instruction issued by the user through the operation panel 27, the generating unit 52 may read the allocation information corresponding to the selected format identification information, thereby performing the processing at Step S134.

If the determination result at Step S122 is affirmative (Yes at Step S122), the allocating unit 51 determines the allocation (Step S123). At Step S123, the allocating unit 51 determines the items of the allocation information of the format specified by the first confirmation screen most recently displayed on the display unit 40B as items to be allocated to the character strings allocated to the items by the allocation (Step S123).

The display control unit 42 performs control for displaying a second confirmation screen on the display unit 40B (Step S124). The second confirmation screen is displayed to urge the user to confirm the contents to be finally transmitted to the server device 3. On the second confirmation screen according to the present embodiment, the items determined at Step S122 are allocated to the respective character strings included in the character string information extracted at Step S114. The second confirmation screen is generated by the generating unit 52.

Specifically, the generating unit 52 reads allocation information corresponding to the format identification information of the format for which allocation is determined by the processing at Step S123. At this time, the generating unit 52 also reads the character string information associated with the items of the allocation information by the processing at Step S307 (refer to FIG. 12). In other words, the generating unit 52 reads the character strings allocated to the respective items of the allocation information by the allocation. In a case where a character string with an item allocated is identical to a sub-item of the item, the generating unit 52 reads a code (e.g., an object code and a claimant code) corresponding to the sub-item identical to the character string.

The generating unit 52 generates the second confirmation screen including a superimposition image and an image indicating the allocation result, for example. The superimposition image is obtained by superimposing, on the image of the image data acquired at Step S112, an image indicating the items allocated to the respective character strings included in the image. The image indicating the allocation result shows a correspondence between the items and the character strings allocated to the items, for example. In a case where a character string with an item allocated is identical to a sub-item of the item, the generating unit 52 generates the second confirmation screen so as to simultaneously display a code corresponding to the sub-item identical to the character string.

Figure 15:
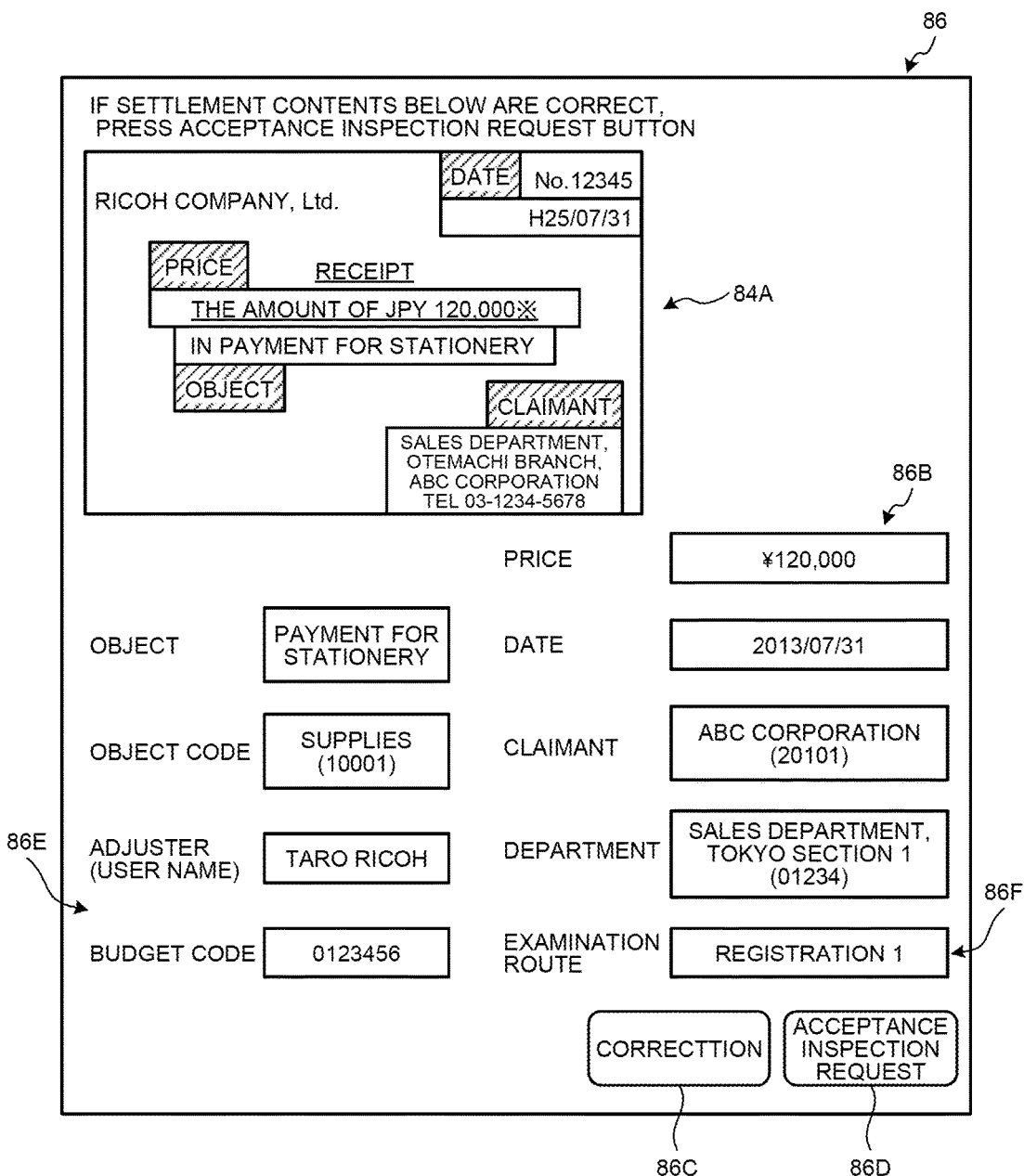
FIG. 15 is a diagram illustrating an example of a second confirmation screen.

FIG. 15 is a schematic of an example of a second confirmation screen 86. The second confirmation screen 86 includes the superimposition image 84A, an image 86B indicating the allocation result, an image 86E indicating the user information, a correction button 86C, and an acceptance inspection request button 86D. FIG. 15 illustrates an example of the second confirmation screen 86 in a case where a receipt available in Japan is used as the document.

Because the superimposition image 84A has already been described, explanation thereof will be omitted. The image 86B indicating the allocation result shows a correspondence between the character strings extracted from the image data of the image on the document and the items allocated to the respective character strings. A character string with no item allocated is not displayed out of the character strings extracted from the image data.

In the image 86B indicating the allocation result, the item "object" is allocated to the character string "payment for stationery", the item "price" is allocated to the character string "JPY 120,000", the item "date" is allocated to the character string "2013/07/31". In the image 86B, the item "claimant" is allocated to the character string "ABC Corporation". The image 86B includes an object code "10001" corresponding to the sub-item "stationery" of the item "object" (refer to FIG. 6). The image 865 further includes a claimant code "20101" corresponding to the sub-item "ABC Corporation" of the item "claimant" (refer to FIG. 7).

The image 86E indicating the user information includes the identification information of the user input at Step S104 (refer to FIG. 10) and the attribute information corresponding to the identification information of the user. In the example in FIG. 15, the image 86E indicating the user information includes "Taro Ricoh" indicating the user name, "sales department, Tokyo section 1 (01234)" indicating a department code, which is attribute information, and a department name identified by the department code, and "0123456" indicating a budget code corresponding thereto.

The correction button 86C is operated by the user to instruct correction of the contents (e.g., character strings) displayed on the second confirmation screen 86. The acceptance inspection request button 86D is operated by the user to transmit an acceptance inspection request to the server device 3 with the contents displayed on the second confirmation screen 86.

The second confirmation screen 86 may display an image indicating an examination route. In the example in FIG. 15, "registration 1" is displayed as an image 86F indicating the examination route. In terms of the examination route, the storage unit 50 stores therein in advance e-mail addresses and identification information of destination devices in association with registration numbers as destinations of the settlement information, for example. The generating unit 52 generates the second confirmation screen 86 including one of the registration numbers, for example.

If the display position of "examination route" is selected and the correction button 86C is operated by an operational instruction issued by the user through the operation panel 27, the generating unit 52 generates the second confirmation screen 86 including a registration number of another examination route. The display control unit 42 performs control for displaying the generated second confirmation screen 86 on the display unit 40B.

Referring back to FIG. 10, the generating unit 52 determines whether or not it has received a correction instruction (Step S126). The generating unit 52 determines whether or not the correction button 86C on the second confirmation screen 86 is operated by the user, thereby making the determination at Step S126. If the generating unit 52 receives a correction instruction (Yes at Step S126), the process proceeds to Step S128.

The generating unit 52 accepts correction information from the user (Step S128). Specifically, let us assume that a character string corresponding to an item is corrected and the correction button 86C is operated by an operational instruction issued by the user through the operation panel 27, for example. In this case, the generating unit 52 receives correction instruction information including the corrected character string, the item allocated to the corrected character string, and a correction instruction via the accepting unit 40A. The generating unit 52 allocates the item included in the correction instruction information to the corrected character string included in the correction instruction information, thereby creating the second confirmation screen. The process is then returned to Step S124.

If the acceptance inspection request button 86D is operated by the user (No at Step S126), the process proceeds to Step S130. At Step S130, the transmitting unit 53 transmits the settlement information including the character strings, the items allocated to the character strings, and the identification information of the user specified by the second confirmation screen most recently displayed at Step S124 to the server device 3 (Step S130). Subsequently, the present routine is terminated.

Specifically, in the processing at Step S130, the transmitting unit 53 reads the allocation information of the format identification information used for the second confirmation screen displayed at Step S124. The transmitting unit 53 also reads the character string information allocated to the items of the allocation information by the processing at Step S307 (refer to FIG. 12). In other words, the transmitting unit 53 reads the character strings allocated to the items of the allocation information by the allocation. In a case where a character string with an item allocated is identical to a sub-item of the item, the transmitting unit 53 reads a code (e.g., an object code and a claimant code) corresponding to the sub-item identical to the character string. In a case where a character string or the like is corrected by the operation of the correction button 86C, the transmitting unit 53 reads the corrected character string instead of the character string prior to the correction.

The transmitting unit 53 transmits the settlement information including the read character strings, the items allocated to the character strings, the identification information of the user input at Step S104 (refer to FIG. 10), and the attribute information corresponding to the identification information of the user to the server device 3. The settlement information includes at least the character strings, the items allocated to the respective character strings, and the identification information of the user. The settlement information may further include the codes corresponding to the sub-items of the items, for example.

The following describes acceptance inspection carried out by the server device 3. In the server device 3 that receives the settlement information, the display control unit 72 performs control for generating a third confirmation screen from the settlement information and displaying it on the display unit 39A. The third confirmation screen is displayed to confirm the settlement contents and carry out the acceptance inspection in the server device 3. The third confirmation screen according to the present embodiment includes the settlement information.

Figure 16:
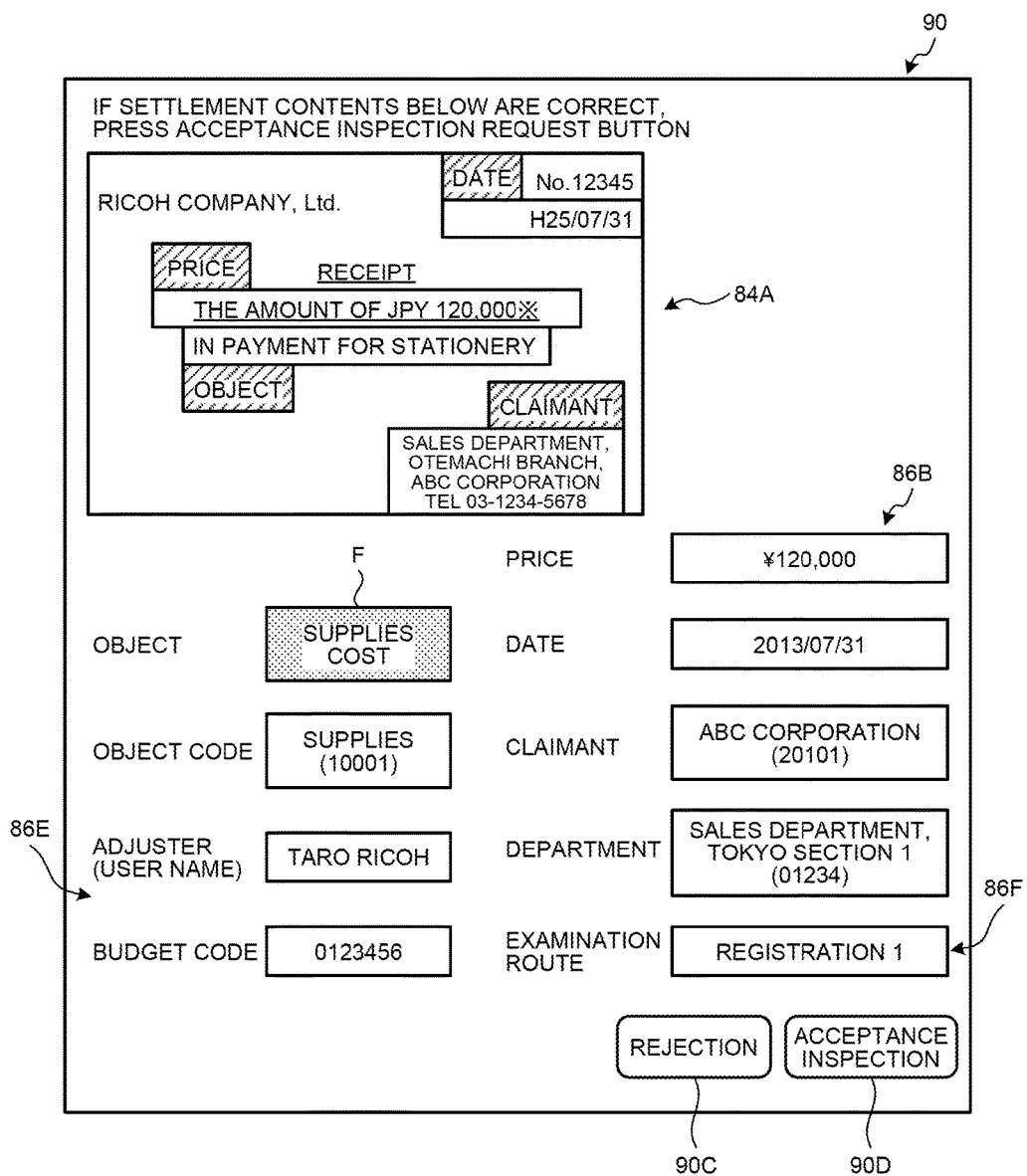
FIG. 16 is a diagram illustrating an example of a third confirmation screen.

FIG. 16 is a schematic of an example of a third confirmation screen 90. FIG. 16 illustrates an example of the third confirmation screen 90 in a case where a receipt available in Japan is used as the document. The third confirmation screen 90 includes the superimposition image 84A, the image 86B indicating the allocation result, the image 86E indicating the user information, the image 86F indicating the examination route, a rejection button 90C, and an acceptance inspection button 90D. The superimposition image 84A, the image 86B indicating the allocation result, the image 86E indicating the user information, and the image 86F indicating the examination route are the same as those in the above description. As indicated by F in FIG. 16, a portion where the user corrects the character string extracted from the image data is marked up by displaying it with a different color from that of the other items, for example.

The rejection button 90C is operated by an administrator who carries out the acceptance inspection to reject the settlement contents displayed on the third confirmation screen 90 using the UI 39 of the server device 3. If the rejection button 90C is operated by an operational instruction issued by the administrator or the like, the acceptance inspection unit 74 transmits information indicating that the settlement is rejected to the MFP 1 serving as the source of the settlement information corresponding to the contents displayed on the third confirmation screen 90.

The acceptance inspection button 90D is operated by the administrator who carries out the acceptance inspection to approve the settlement contents displayed on the third confirmation screen 90 and carry out the acceptance inspection using the UI 39 of the server device 3. If the acceptance inspection button 90D is operated by an operational instruction issued by the administrator or the like, the acceptance inspection unit 74 performs the predetermined processing required for settlement (e.g., calculation of charges to be paid to a claimant and creation of a slip) using the character strings corresponding to the respective items relating to the settlement included in the settlement information corresponding to the settlement contents displayed on the third confirmation screen 90. The server device 3 may transmit payment information resulting from the acceptance inspection to the MFP 1, for example. The MFP 1 may store the received payment information in the flash memory 24.

As described above, the accepting unit 40A in the information processing system 1000 according to the present embodiment receives the identification information for identifying the user of the MFP 1. The reading unit 17A reads an image on a document, such as a receipt, thereby outputting image data. The extracting unit 48 extracts the character string information including character strings in the image, the first position information on the character strings in the image, and the first form of the character strings from the image data. The storage unit 50 stores therein the allocation information that associates items relating to settlement, the second position information on the items on the document, and the second form of the items with one another. The allocating unit 51 compares the allocation information with the character string information to allocate the items included in the allocation information to the character strings. The transmitting unit 53 transmits the settlement information including the character strings, the items allocated to the character strings, and the identification information of the user to the server device 3.

With this configuration, the information processing system 1000 according to the present embodiment can make it unnecessary for the user to manually input the items relating to settlement, for example, and can prevent erroneous input.

Thus, the information processing system 1000 according to the present embodiment can reduce a workload relating to settlement.

The information processing system 1000 according to the present embodiment compares the character string information extracted from the image data obtained by reading the image on the document with the allocation information stored in advance for each format. The information processing system 1000 allocates the items included in the allocation information of the format having agreement with the character string information equal to or larger than the threshold to the character strings of the character string information. Even in a case where various types of documents having different formats are read, the information processing system 1000 can easily generate the settlement information used for the acceptance inspection.

Thus, the information processing system 1000 according to the present embodiment can reduce a workload relating to settlement.

To calculate the agreement, the information processing system 1000 according to the present embodiment uses both the position information and the form information. With this configuration, the information processing system 1000 can more accurately allocate the items included in the allocation information that agrees with the format of the document to be read to the character strings. Thus, the information processing system 1000 according to the present embodiment can generate more accurate settlement information.

The transmitting unit 53 according to the present embodiment transmits the settlement information including the character strings, the items allocated to the character strings, and the identification information of the user to the server device 3. Alternatively, the transmitting unit 53 may control the output unit 17B so as to print the settlement information on a recording medium in a predetermined style for submitting it to the administrative department that carries out the acceptance inspection. Still alternatively, the transmitting unit 53 may perform both the transmission of the settlement information to the server device 3 and the printing control on the output unit 17B.

FIGS. 5, 8, 9, 13, 14, 15, and 16 illustrate an example where a receipt available in Japan is used as the document.

As described above, the "document" in the information processing system 1000 according to the present embodiment may be any one of statements of delivery, bills, estimates, purchase orders, and vouchers, for example, and is not limited to receipts. As described above, the "document" in the information processing system 1000 according to the present embodiment may be any one of receipts, bills, estimates, purchase orders, and vouchers available in countries over the world and between countries, for example, and is not limited to those available in Japan. As described above, the document may be an invoice (a shopping invoice, a commercial invoice, a customs invoice, and a proforma invoice), for example.

Also in a case where the document is an invoice, for example, the information processing system 1000 stores in advance the allocation information (refer to FIG. 4) corresponding to the format identification information of the format of the invoice in the storage unit 50 and performs the processing described above.

Thus, the information processing system 1000 according to the present embodiment can reduce a workload relating to settlement not only in the case of using a document available in a specific country but also in the case of using a document for settlement available in countries over the world and between countries.

The main body 10 or the operating unit 20 in the information processing system 1000 according to the present embodiment may calculate a service charge based on the number of times the reading unit 17A reads the document (the number of documents). In this case, the main body 10 or the operating unit 20 may include a calculation unit (not illustrated). Alternatively, the calculation unit may calculate a usage fee based on the number of times the transmitting unit 53 transmits the settlement information and various types of information to the server device 3.

In this case, a storage device, which is not illustrated, (or the storage unit 50) may store therein the number of times of reading the document (the number of documents) and the number of times of transmitting the settlement information, for example. The number of times of reading stored in the storage device may be updated every time the reading unit 17A reads a document. The number of times of transmission stored in the storage device may be updated every time the transmitting unit 53 transmits the settlement information. The calculation unit provided to the main body 10 or the operating unit 20 may calculate the usage fee by multiplying a usage unit price determined in advance by the user and a provider of the information processing system 1000 by the number of times of reading the document or the number of times of transmission.

The storage device, which is not illustrated, (or the storage unit 50) may store therein use start time of the information processing device (MFP) 1 or the information processing system 1000. In this case, the calculation unit provided to the main body 10 or the operating unit 20 may calculate the usage fee based on a use period from the use start time (e.g., in units of one month, a half year, one day, and one hour). The calculation unit may transmit the calculated usage fee to the information processing device used by the user. With this operation, the calculation unit may charge the usage fee for the user.

While the operating unit 20 according to the present embodiment is provided separately from the main body 10 and performs the allocation, the operating unit 20 may be integrated with the main body 10. While the server device 3 according to the present embodiment carries out the acceptance inspection, the acceptance inspection unit 74 may be provided to the MFP 1, the operating unit 20, or the main body 10 and carry out the acceptance inspection.

While the main body 10 and the operating unit 20 according to the embodiment above are operated independently by different OSs, the configuration is not limited thereto. The main body 10 and the operating unit 20 may be operated by a single OS, for example.

While the MFP 1 according to the embodiment above also performs order processing, the external device 2 may access the operating unit 20 of the MFP 1 to start an order processing program for performing the order processing, thereby performing the order processing.

While the information processing system 1000 according to the present embodiment includes one server device 3 and one MFP 1, for example, the information processing system 1000 may include a plurality of MFPs 1 and a plurality of server devices 3. The functions provided to the server device 3 described in the present embodiment may be distributed to the server devices 3.

The information processing system 1000 described in the present embodiment has a system configuration where the MFP 1 and the server device 3 are connected. The system configuration is given by way of example only, and various types of exemplary system configurations can be employed depending on uses and purposes.

Computer Program

The computer program executed in the information processing system 1000 according to the embodiment above may be provided in a manner recorded in a computer-readable recording medium, such as a compact disc read only memory (CD-ROM), a flexible disk (FD), a compact disc recordable (CD-R), a digital versatile disc (DVD), and a universal serial bus (USB) memory, as an installable or executable file. The computer program executed in the information processing system 1000 according to the embodiment above may be provided or distributed via a network, such as the Internet. The various types of computer programs may be embedded and provided in a ROM, for example.

The present invention can reduce a workload relating to settlement.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system including one or more processors and a non-transitory computer readable medium storing one or more programs executable by the processors to cause the processors to perform an information processing method, wherein the method comprises:
 (a) accepting identification information for identifying a user of an apparatus;
 (b) reading an image of a document to output image data;
 (c) extracting character string information including a character string in the image and first position information corresponding to region of the character string in the image, from the image data;
 (d) storing, in a storage unit, allocation information in which an item relating to settlement is associated with second position information corresponding to region of the item on the document;
 (e) comparing the allocation information retrieved from the storage unit with the character string information extracted from the image data, and allocating the item of the stored allocation information to the character string of the extracted character string information when the region specified by the first position information of the extracted character string information overlaps the region specified by the second position information of the stored allocation information;
 (f) transmitting settlement information including the character string, the item allocated to the character string, and the identification information; and
 (g) controlling screens displayed, or to be displayed, on a display unit, and upon the item of the stored allocation information having been allocated to the character string of the extracted character string information, causing a confirmation screen to be generated and displayed on the display unit, the confirmation screen including (i) a superimposition image in which the item related to settlement and allocated to the character string is superimposed adjacent to the character string, on the image of the document, (ii) a request to confirm format of the superimposition image in the displayed screen, and (iii) a format change part to request change of format of the displayed screen, and when the format change part is activated, causing a registration screen to be generated and displayed in place of the confirmation screen, on the display unit, the registration screen including a frame image of the item related to settlement and allocated to the character string and superimposed on the region of the character string on the image of the document, to permit change of the second position information corresponding to the region of the item on the document.

2. The information processing system according to claim 1, wherein the item included in the allocation information to the character string included in the character string information is allocated in (e) based on a comparison result obtained by comparing the character string information with the allocation information.

3. The information processing system according to claim 2,
 wherein the method further comprises (e1) determining degree of agreement between the character string information and the allocation information as the comparison result, and
 wherein the item included in the allocation information is allocated in (e) to the character string included in the character string information when the degree of agreement is equal to or larger than a threshold determined in advance.

4. The information processing system according to claim 3,
 wherein the storage unit stores therein the allocation information for each format corresponding to a form of the document,
 wherein the method further comprises determining the degree of agreement between the character string information and the allocation information for each format, and
 wherein the item included in the allocation information corresponding to a format having the agreement equal to or larger than the threshold is allocated in (e) to the character string included in the character string information.

5. The information processing system according to claim 4, wherein the item included in the allocation information corresponding to a format selected by the user out of formats having the agreement equal to or larger than the threshold is allocated in (e) to the character string included in the character string information.

6. The information processing system according to claim 3, wherein the degree of agreement determined in (e1) increases when the first position information on the character string included in the character string information agrees with the second position information on the item included in the allocation information.

7. The information processing system according to claim 3, wherein the degree of agreement determined in (e1) increases when the first position information and the first form of the character string included in the character string information agree with the second position information and the second form of the item included in the allocation information.

8. The information processing system according to claim 3, wherein the method further comprises registering allocation information corresponding to a new format in the storage unit when the degree of agreement is smaller than the threshold.

9. The information processing system according to claim 1, wherein the character string information including the character string, the first position information, and a first form of the character string is extracted in (c) from the image data, and
the storage unit stores therein the allocation information in which the item, the second position information, and a second form of the item are associated with one another.

10. The information processing system according to claim 1,
wherein the storage unit further stores therein user information in which the identification information is associated with attribute information of the user identified by the identification information, and
wherein the settlement information transmitted in (f) includes the character string, the item allocated to the character string, the identification information accepted in (a), and the attribute information corresponding to the identification information.

11. The information processing system according to claim 1, wherein the method further comprises calculating a usage fee based on a number of times (b) is performed to read an image of a document or on a use period of the information processing system.

12. A non-transitory computer readable medium storing one or more programs for causing a computer to execute an information processing method, wherein the method comprises:
accepting identification information for identifying a user of an apparatus;
reading an image of a document and outputting image data;
extracting character string information including a character string in the image and first position information corresponding to region of the character string in the image from the image data;
comparing (i) allocation information in which an item relating to settlement is associated with second position information corresponding to region of the item on the document with (ii) the character string information extracted from the image data, and allocating the item of the allocation information to the character string of the extracted character string information when the region specified by the first position information of the extracted character string information overlaps the region specified by the second position information of the allocation information;
transmitting settlement information including the character string, the item allocated to the character string, and the identification information to a server device via a network; and
controlling screens displayed, or to be displayed, on a display unit, including, upon the item of the stored allocation information having been allocated to the character string of the extracted character string information, causing a confirmation screen to be generated and displayed on the display unit, the confirmation screen including (a) a superimposition image in which the item related to settlement and allocated to the character string is superimposed adjacent to the character string, on the image of the document, (b) a request to confirm format of the superimposition image in the displayed screen, and (c) a format change part to request change of format of the displayed screen, and when the format change part is activated, causing a registration screen to be generated and displayed in place of the confirmation screen, on the display unit, the registration screen including a frame image of the item related to settlement and allocated to the character string and superimposed on the region of the character string on the image of the document, to permit change of the second position information corresponding to the region of the item on the document.

13. A computer program product comprising a non-transitory computer-readable medium that contains a computer program that causes a computer to execute:
accepting identification information for identifying a user of an apparatus;
reading an image of a document and outputting image data;
extracting character string information including a character string in the image and first position information corresponding to region of the character string in the image from the image data;
comparing (i) allocation information in which an item relating to settlement is associated with second position information corresponding to region of the item on the document with (ii) the character string information extracted from the image data, and allocating the item of the allocation information to the character string of the extracted character string information when the region specified by the first position information of the extracted character string information overlaps the region specified by the second position information of the allocation information;
transmitting settlement information including the character string, the item allocated to the character string, and the identification information to a server device via a network; and
controlling screens displayed, or to be displayed, on a display unit, including, upon the item of the stored allocation information having been allocated to the character string of the extracted character string information, causing a confirmation screen to be generated and displayed on the display unit, the confirmation screen including (a) a superimposition image in which the item related to settlement and allocated to the character string is superimposed adjacent to the character string, on the image of the document, (b) a request to confirm format of the superimposition image in the displayed screen, and (c) a format change part to request change of format of the displayed screen, and when the format change part is activated, causing a registration screen to be generated and displayed in place of the confirmation screen, on the display unit, the registration screen including a frame image of the item related to settlement and allocated to the character string and superimposed on the region of the character string on the image of the document, to permit change of the second position information corresponding to the region of the item on the document.

* * * * *